United States Patent
Guo et al.

(10) Patent No.: US 9,987,626 B2
(45) Date of Patent: Jun. 5, 2018

(54) USE OF TRANSITION METALS TO REDUCE COLD START EMISSIONS

(71) Applicant: Ford Global Technologies, LLC, Dearborn, MI (US)

(72) Inventors: Gang Guo, Ann Arbor, MI (US); Giovanni Cavataio, Dearborn, MI (US); Hungwen Jen, Troy, MI (US); Rachael Harrington, Canton, MI (US); Lifeng Xu, Northville, MI (US); Jason Aaron Lupescu, Wayne, MI (US); Jeffrey Scott Hepburn, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 14/831,075

(22) Filed: Aug. 20, 2015

(65) Prior Publication Data

US 2017/0050181 A1  Feb. 23, 2017

(51) Int. Cl.
| | | |
|---|---|---|
| *B01J 29/06* | (2006.01) | |
| *B01J 35/00* | (2006.01) | |
| *B01J 29/80* | (2006.01) | |
| *B01J 29/78* | (2006.01) | |
| *B01J 29/76* | (2006.01) | |
| *B01D 53/94* | (2006.01) | |
| *B01J 37/02* | (2006.01) | |
| *B01J 29/072* | (2006.01) | |
| *B01J 29/076* | (2006.01) | |

(52) U.S. Cl.
CPC .......... *B01J 35/0006* (2013.01); *B01D 53/94* (2013.01); *B01D 53/945* (2013.01); *B01D 53/9445* (2013.01); *B01D 53/9459* (2013.01); *B01D 53/9468* (2013.01); *B01J 29/7615* (2013.01); *B01J 29/7815* (2013.01); *B01J 29/80* (2013.01); *B01J 37/0215* (2013.01); *B01J 37/0244* (2013.01); *B01J 37/0246* (2013.01); *B01D 2255/1021* (2013.01); *B01D 2255/1023* (2013.01); *B01D 2255/1025* (2013.01); *B01D 2255/2065* (2013.01); *B01D 2255/2073* (2013.01); *B01D 2255/20753* (2013.01); *B01D 2255/20761* (2013.01); *B01D 2255/502* (2013.01); *B01D 2255/9025* (2013.01); *B01D 2255/912* (2013.01); *B01J 29/072* (2013.01); *B01J 29/076* (2013.01); *B01J 2229/186* (2013.01); *Y02T 10/20* (2013.01); *Y02T 10/22* (2013.01)

(58) Field of Classification Search
CPC .... B01J 29/80; B01J 29/7815; B01J 29/7615; B01J 29/076; B01J 29/072; B01J 2229/186; B01J 35/0006; B01J 37/0215; B01J 37/0244; B01J 37/0246; B01D 53/94; B01D 53/9445; B01D 53/9459; B01D 53/9468; Y02T 10/22; Y02T 10/20
USPC ........ 502/64, 66, 67, 69, 74, 527.12, 527.13
See application file for complete search history.

(56) References Cited

U.S. PATENT DOCUMENTS

| | | | | |
|---|---|---|---|---|
| 6,074,973 | A * | 6/2000 | Lampert | B01D 53/945 423/213.2 |
| 7,531,029 | B2 | 5/2009 | Hoke et al. | |
| 8,409,515 | B2 | 4/2013 | Ren et al. | |
| 8,580,228 | B2 | 11/2013 | Zones et al. | |
| 8,844,274 | B2 | 9/2014 | Lambert et al. | |
| 2011/0030346 | A1 * | 2/2011 | Neubauer | B01D 53/944 60/274 |
| 2011/0158871 | A1 * | 6/2011 | Arnold | B01J 35/0006 423/212 |
| 2013/0287659 | A1 | 10/2013 | Lupescu et al. | |
| 2014/0157763 | A1 | 6/2014 | Chandler et al. | |

FOREIGN PATENT DOCUMENTS

EP  0 639 400 A1  2/1995

OTHER PUBLICATIONS

Golubeva, V. et al., "Study of Mordenite ZSM-5 and NaY Zeolites, Containing Cr, Cs, Zn, Ni, Co, Li, Mn, to Control Hydrocarbon Cold-Start Emission," World Academy of Sci., Eng. & Tech., v. 5, pp. 187-1389 (2011).
Puertolas, B. et al., "Bifunctional Cu/H-ZSM-5 Zeolite with Hierarchical Porosity for Hydrocarbon Abatement Under Cold-Start Conditions," Applies Catalysis B: Environmental, vols. 154-155, pp. 161-170, Abstract Only (2014).
Manuel., V. et al., "'No-Noble-Metal' Catalytic trap to remove Hydrocarbons, NOx and CO emissions from combustion engines," (University of Alicante), Sep. 2, 2014, pp. 1-7.

* cited by examiner

*Primary Examiner* — Elizabeth D Wood
(74) *Attorney, Agent, or Firm* — Julie Voutyras; Brooks Kushman P.C.

(57) ABSTRACT

A hydrocarbon trap catalyst and method of forming the same are disclosed. The method may include introducing copper into a zeolite at 10% to 75% of an ion-exchange level of the zeolite, introducing at least one of nickel and manganese into a zeolite at 50% to 100% total of an ion-exchange level of the zeolite, and applying a three-way catalyst layer. The copper and nickel and/or manganese may be introduced into a single zeolite or the copper may be introduced into a first zeolite layer and the nickel and/or manganese may be introduced into a second zeolite layer. If copper and another metal are introduced into the same zeolite, copper may be introduced first. The disclosed trap catalyst may increase the release temperature of hydrocarbons such as ethanol, propylene and toluene, and thus reduce vehicle cold start tailpipe emissions.

20 Claims, 14 Drawing Sheets

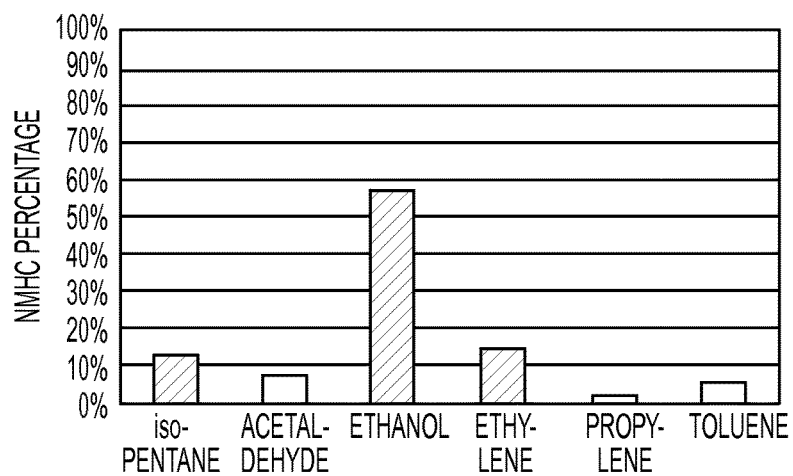
FIG. 3
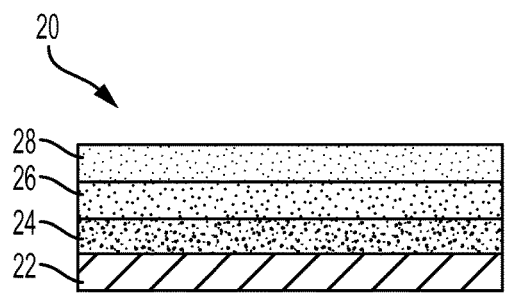 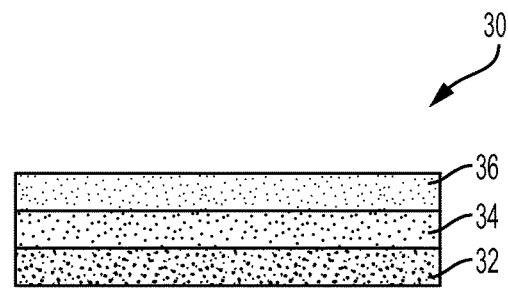
FIG. 4    FIG. 5

USE OF TRANSITION METALS TO REDUCE COLD START EMISSIONS

TECHNICAL FIELD

The present disclosure relates to using transition metals to reduce cold start emissions, for example, hydrocarbon emissions.

BACKGROUND

Reduction of tailpipe emissions is a constant goal in the automotive industry. As the standards for emissions continue to decrease, technologies must continually improve to meet the standards. Tailpipe emissions based on current standards may need to be reduced to meet future regulations, such as SULEV30 (Super Ultra-Low Emission Level) and SULEV20. Hydrocarbon (HC) cold start emission is one challenge for emission reduction and many efforts have been focused on this area. The traditional approaches to reducing cost start HC emissions include developing catalysts that can warm up quickly and light-off at lower temperatures and optimizing engine cold start conditions to deliver heat to the catalyst as quickly as possible. However, even with very fast catalyst light-off, there are generally at least tens of seconds during cold start when the catalyst is not warm enough to convert any HC species. For the PZEV (Partial Zero Emission Vehicle) level emission standard, this amount of HC is important and may require additional development.

SUMMARY

In at least one embodiment, a hydrocarbon trap catalyst is provided. The catalyst may include a first zeolite layer of a first zeolite material and including copper present at 15% to 75% of an ion-exchange level of the first zeolite material; a second zeolite layer of a second zeolite material and including at least one of nickel and manganese present at 50% to 100% total of an ion-exchange level of the second zeolite material; and a three-way catalyst layer.

The first and second zeolite materials may be the same type of zeolite material. In one embodiment, the copper occupies 20% to 50% of a total number of ion-exchange sites of the first zeolite material and the at least one of nickel and manganese occupies a total of 50% to 100% of a total number of ion-exchange sites of the second zeolite material. The catalyst may further comprise a substrate, and the first zeolite layer may overly the substrate. The first zeolite layer may be an extruded zeolite layer.

In one embodiment, the copper is present in the first zeolite layer at 30% to 50% of the ion-exchange level of the first zeolite material. In another embodiment, the at least one of nickel and manganese is present in the second zeolite layer at 85% to 100% total of the ion-exchange level of the second zeolite material. The second zeolite layer may include only one of nickel and manganese. The first zeolite material and the second zeolite material may be beta zeolites having a silica-alumina ratio of 25 to 50. In one embodiment, the second zeolite layer is in overlying contact with the first zeolite layer and the three-way catalyst layer is in overlying contact with the second zeolite layer.

In at least one embodiment, a method of forming a hydrocarbon trap catalyst is provided. The method may include introducing copper into a zeolite at 10% to 75% of an ion-exchange level of the zeolite; introducing at least one of nickel and manganese into a zeolite at 50% to 100% total of an ion-exchange level of the zeolite; and applying a three-way catalyst layer overlying the zeolite including copper and the zeolite including at least one of nickel and manganese.

The copper and the at least one of nickel and manganese may be introduced into a single zeolite, and the copper may be introduced prior to the at least one of nickel and manganese. The copper may be introduced into a first zeolite layer and the at least one of nickel and manganese may be introduced into a second zeolite layer. The three-way catalyst may be applied to the second zeolite layer. The method may include forming the first zeolite layer on a substrate layer or extruding the first zeolite layer. The copper and the least one of nickel and manganese may be introduced by ion-exchange or by wet impregnation. In one embodiment, the copper is introduced into the zeolite at 20% to 50% of an ion-exchange level of the zeolite and the at least one of nickel and manganese is introduced into the zeolite at 85% to 100% total of an ion-exchange level of the zeolite.

In at least one embodiment, a hydrocarbon trap catalyst is provided. The catalyst may include a zeolite including copper present at 10% to 75% of an ion-exchange level of the zeolite and at least one of nickel and manganese present at 50% to 100% total of an ion-exchange level of the zeolite; and a three-way catalyst layer covering the zeolite. The zeolite may be a beta zeolite having a silica-alumina ratio of 25 to 50. Copper may occupy 20% to 50% of a total number of ion-exchange sites of the zeolite material.

BRIEF DESCRIPTION OF THE DRAWINGS

FIG. 3 is an example profile of HCs entering an HC trap catalyst for E85 fuel;

FIG. 4 is a schematic cross-section of an HC trap catalyst including a substrate, according to an embodiment;

FIG. 5 is a schematic cross-section of an HC trap catalyst with an extruded first layer, according to an embodiment;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
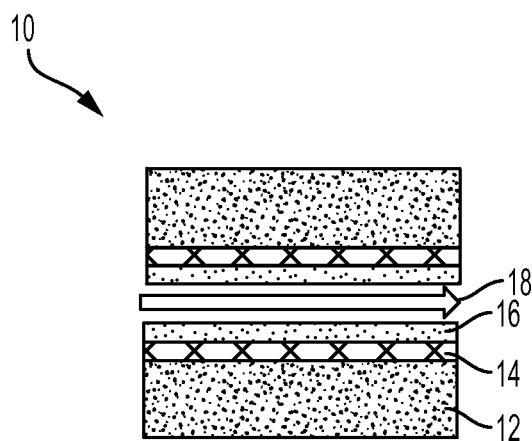
FIG. 1 is a schematic cross-section of a hydrocarbon (HC) trap catalyst, according to an embodiment.

A different approach to reducing cold start HC emission is an HC-trap catalyst. In general, HC-Traps are configured to adsorb engine-out HCs during cold start and convert them when the precious metal-based TWC (Three-Way-Catalyst) layer is warmed up. An example of an HC-trap catalyst 10 (HCTC) is shown in FIG. 1. The HC-trap catalyst 10 may include a substrate 12, which may have a plurality of channels or openings through which the exhaust gas passes. The substrate 12 may be a monolith or extruded material, such as cordierite. A trap layer 14 may be disposed on and cover at least a portion of the substrate 12. The trap layer 14 may include a zeolite material coated on the substrate 12. Zeolites are microporous, aluminosilicate minerals including interlinked tetrahedra of alumina ($AlO_4$) and silica ($SiO_4$). A TWC layer 16 may be coated on top of the trap layer 14. In general, the HC-trap catalyst works by adsorbing HC in the trap layer 14 during cold start and releasing it when the trap layer 14 is warmed up. Meanwhile, the TWC layer 16 is heated by the exhaust gas 18 and converts the released HC from trap layer 14 when TWC layer 16 is warm enough to be in its operating range.

The challenge for this approach is that TWC needs a considerable high temperature (above 250° C.) for HC light-off and zeolite normally releases most HC before TWC is hot enough to convert HC. This invention aims to overcome this obstacle by improving the HC adsorption and desorption performance using some transition metals, such as Cu, Ni and Mn in zeolite. Based on the experimental results, when Cu is added to the zeolite, the new material can adsorb more propylene and release the adsorbed propylene at higher temperature than zeolite only. Also, Cu added to the zeolite can significantly reduce the release of ethanol and toluene at low temperature during the warm up. Ni or Mn added zeolites can significantly increase the release temperature of ethanol. Ethanol is the major cold start HC species for E85 fueled engine and Toluene and propylene are major cold start HC species for E10 fueled engines. Therefore, Ni or Mn added zeolites can benefit E85 fueled engines and Cu added zeolite can benefit E10 fueled engines. Collectively, zeolite with both Ni and Cu added can reduce cold start HC emissions (ethanol, toluene and propylene) for engines using either E10 or E85 fuel.

Figure 2:
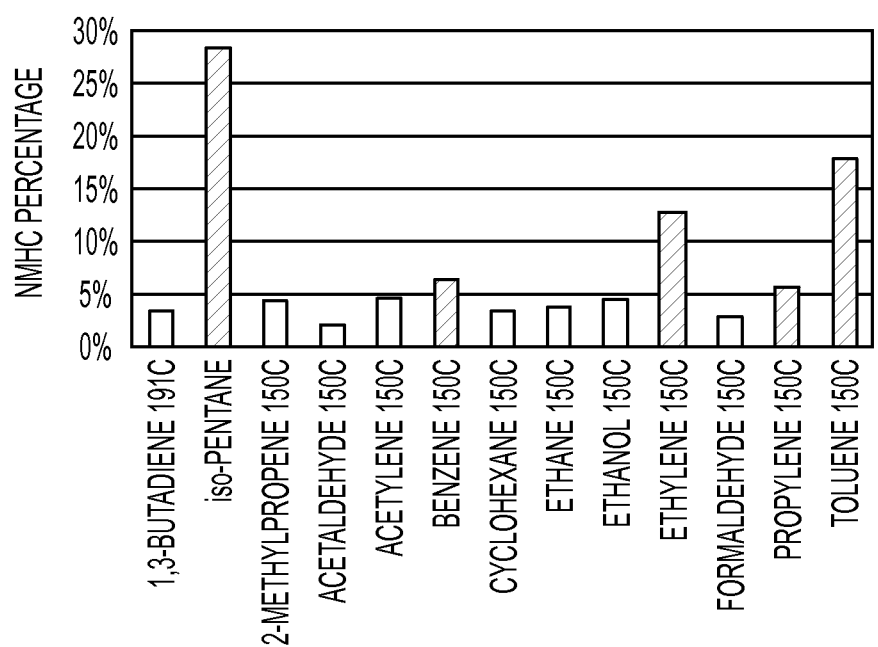
FIG. 2 is an example profile of HCs entering an HC trap catalyst for E10 fuel.

There are many types of zeolite and not all of them may be suitable for storing the relevant hydrocarbons for engine emissions. In addition, engine emissions may vary depending on the type of fuel being combusted. In particular, the HC species entering the HC Trap catalyst 10 during cold start may vary based on the type of fuel used by the engine. E10 (10% Ethanol) and E85 (85% Ethanol) are two examples of fuel types, and will be used for the future emission tests. FIGS. 2 and 3 show the HC profiles entering the HC Trap based on the vehicle test data (accumulated during 70 s after cold start). As shown in the Figures, the cold start HC profiles for E10 and E85 are quite different. For E10 fuel (FIG. 2), the major contributors of note are iso-pentane, toluene, ethylene and propylene. For E85 fuel (FIG. 3), the major contributors of note are ethanol, ethylene, iso-pentane and acetaldehyde.

With reference to FIGS. 4 and 5, embodiments of a HC-trap are shown. The embodiments shown in FIGS. 4 and 5 show a portion of the HC-trap in cross-section, however, it is to be understood that the traps may be configured such as shown in FIG. 1 with a gas flowing into the trap and surrounded by the various layers. With reference to FIG. 4, a HC-trap catalyst 20 (HCTC) is shown that includes a substrate layer 22. The substrate 22 may have a plurality of channels or openings through which the exhaust gas passes. The substrate 12 may be a monolith or extruded material, such as cordierite or any other suitable material known in the art. Disposed over, overlying, or coating the substrate may be a first trap layer 24, which may include a zeolite material. In one embodiment, the first trap layer 24 may overly and contact the substrate layer 22.

The first trap layer 24 may have one or more transition metals included therein. The transition metal(s) may include one or more of nickel, manganese, and copper. The transition metal(s) may be included or introduced into the zeolite using any suitable method, such as ion-exchange, impregnation (e.g., wet), or others. In one embodiment, the transition metal(s) may be exchanged in the zeolite using ion-exchange. In this process, the transition metal(s) may be substituted or swapped for one or more elements or molecules in the zeolite (e.g., $H^+$, $NH_4^+$, etc.). In another embodiment, a transition metal ion may be swapped for an aluminum ion in the zeolite (e.g., a framework substitution).

When ion-exchange is used as a method for introducing the transition metal(s), there may be an ion-exchange limit at which no additional exchanges may take place. The ion-exchange limit may depend on the composition of the zeolite. For example, the silica-alumina ratio of the zeolite ($Si/Al_2$ ratio) may affect the ion-exchange limit. In general, the more aluminum that is present in the zeolite, the higher the ion-exchange limit may be. Accordingly, a lower $Si/Al_2$ ratio may result in a higher ion-exchange limit. Conversely, a higher $Si/Al_2$ ratio may result in a lower ion-exchange limit. For example, a zeolite with a $Si/Al_2$ ratio of about 38 may have an ion-exchange limit of about 2-3 wt. %. Therefore, the amount of transition metal(s) included in the zeolite may be expressed as an absolute value, such as weight percent, or it may be expressed as a percentage of the ion-exchange limit. Additional quantities of metal(s) may be introduced above the ion-exchange limit, which may form less stable bond linkages. The metal ions may become loose as the acid site attracts water. Metal that is not ion-exchanged in the zeolite may form a catalytic metal oxide, which may not trap and hold HCs like ion-exchanged metal ions.

The theoretical ion exchange limit of Cu in zeolite may be expressed as a percentage of the actual metal ions to Al in the zeolite on a per atom basis (metal actual/Al) relative to the maximum desired limit of metal load to Al in the zeolite (metal limit/Al). In one example, the limit of $Cu^{+2}$ in zeolite is Cu/Al=0.5, since it needs two Al—O⁻ exchange sites. Expressing a zeolite in terms of structure code (e.g., BEA, MFI or FAU) followed by the $Si/Al_2$ ratio, then a theoretical ion-exchange limit (IEL) for copper corresponds to 3.9 wt % in BEA-25 and 2.5 wt % in BEA40. Accordingly, a Cu/Al of 0.2, or 40% of the ion exchange limit, would correspond to 1 wt % Cu in BEA40 and 1.6 wt % Cu in BEA25. In one embodiment, the first trap layer 24 may include 0.1 to 5.0 wt. % of transition metals, or any sub-range therein. For example, the first trap layer 24 may include 0.3 to 4.0 wt. %, 0.3 to 3.5 wt. %, 0.5 to 3.5 wt. %, 0.5 to 3.0 wt. %, 0.5 to 2.5 wt. %, 0.5 to 2.0 wt. %, 0.75 wt. % to 2.0 wt. %, 0.5 to 1.5 wt. %, 0.75 wt. % to 1.5 wt. %, or 0.5 to 1.0 wt. % of transition metals. The transition metal(s) may include one or more of nickel, manganese, and copper.

Stated as a percentage of the ion-exchange limit, the first trap layer 24 may include transition metals in an amount from 5% to 100% of the ion-exchange limit (IEL) of the zeolite, or any sub-range therein. For example, the first trap layer 24 may include from 10% to 100%, 10% to 90%, 10% to 85%, 10% to 75%, 10% to 60%, 10% to 50%, 10% to 45%, 20% to 45%, 25% to 45%, 30% to 45%, 35% to 45%, or about 40% (e.g., ±3%) of the IEL in transition metals. In another embodiment, the first trap layer 24 may include from 50% to 100%, 75% to 100%, 85% to 100%, 90% to 100%, 40% to 85%, 50% to 75%, 50% to 85%, or 50% to 90% of the ion-exchange limit. These disclosed percentages may also be expressed as Cu/Al ratios. For example a range of 10% to 50% may be from Cu/Al=0.05 Cu/Al=0.25. The percentages disclosed above may refer to a total amount of the transition metal(s) and/or it may refer to the occupation of the ion exchange sites by the transition metal(s). For example, if copper is present at 40% of the ion exchange limit, it may also occupy 40% of the ion exchange sites in the zeolite. Depending on the method used for including the transition metal(s), a level higher than the ion-exchange limit may be introduced into the zeolite. For example, if copper is present at 40% of the ion-exchange limit and nickel is present at 90% of the ion-exchange limit, at least some of the copper and/or nickel may not occupy an ion exchange site in the zeolite (e.g., they may be excess metal(s)). In at least one embodiment, the amount of transition metal(s) introduced into the zeolite may be less than or equal to the ion-exchange limit. In one embodiment, the amount of transition metal(s) is less than the ion-exchange limit.

In one embodiment, the first trap layer 24 may be a copper zeolite layer (e.g., zeolite with copper exchanged or impregnated). The copper zeolite layer may include only copper, or substantially only copper (e.g., less than 0.01 wt. % other elements) as a substituted/added/exchanged element or there may be additional elements (e.g., Ni or Mn). The zeolite may be any suitable zeolite type, such as those with pore dimensions capable of trapping the hydrocarbons and other emissions described herein. Examples of zeolite types that may be used include beta, X, Y, Mordenite, ZSM-5, CHA, Ultra-Stable Y, or others. In one embodiment, the zeolite may be a beta zeolite. Beta zeolite generally includes an intergrowth of two polymorphs—A and B. The polymorphs may form as two-dimensional sheets and may alternate within the overall structure. Each polymorphs may include a 3-D network of pores, such as 12-ring pores. In one embodiment, the silica-alumina ratio of the zeolite may be from 25 to 50, or any sub-range therein, such as 30 to 45 or 35 to 40. In one embodiment, the silica-alumina ratio may be about 38.

The copper zeolite layer may have a copper level that is at or below the ion-exchange limit (e.g., ≤100% of the ion-exchange limit). As described above, the ion-exchange limit (IEL) may vary depending on the properties of the zeolite, including the silica-alumina ratio. In one embodiment, the copper level may be below the IEL, such as from 5% to 90% of the IEL, or any sub-range therein. For example, the copper level may be from 10% to 85%, 10% to 75%, 10% to 65%, 10% to 60%, 10% to 50%, 15% to 50%, 15% to 60%, 20% to 50%, 25% to 50%, 30% to 50%, 35% to 50%, 30% to 45%, 35% to 45%, or about 40% (e.g., ±3%) of the IEL. In another embodiment, the copper level may be from 30% to 85%, 40% to 80%, 50% to 75%, or 55% to 70% of the IEL. The percentages disclosed above may refer to a total amount of the copper and/or it may refer to the occupation of the ion exchange sites by the copper. In absolute terms, the copper level may be from 0.2 to 4.0 wt. % of the zeolite, or any sub-range therein. For example, copper may be from 0.2 to 3.5 wt. %, 0.3 to 3.0 wt. %, 0.3 to 2.5 wt. %, 0.3 to 2.0 wt. %, 0.3 to 1.5 wt. %, 0.3 to 1.0 wt. %, 0.3 to 0.8 wt. %, 0.4 wt. % to 0.7 wt. %, 0.4 to 0.6 wt. %, or about 0.5 wt. % (e.g., ±0.05 wt. %). In one embodiment, all or substantially all (e.g., at least 99 wt. %) of the copper may be occupying an ion exchange site.

Disposed over, overlying, or covering the first trap layer 24 (e.g., copper zeolite layer) may be a second trap layer 26. In one embodiment, the second trap layer 26 may be in overlying contact with the first trap layer 24. The second trap layer 26 may have one or more transition metals included therein. The transition metal(s) may include one or more of nickel, manganese, and copper. Similar to the first trap layer

24, the transition metal(s) may be included or introduced into the zeolite using any suitable method, such as ion-exchange, impregnation (e.g., wet), or others.

In one embodiment, the second trap layer 26 may include 0.1 to 8.0 wt. % of transition metals, or any sub-range therein. For example, the second trap layer 26 may include transition metals from 0.3 to 8.0 wt. %, 0.5 wt. % to 7.5 wt. %, 1.0 wt. % to 7.5 wt. %, 2.0 wt. % to 7.5 wt. %, 3.0 wt. % to 7.5 wt. %, 4.0 wt. % to 7.5 wt. %, 5.0 wt. % to 7.5 wt. %, 6.0 wt. % to 7.5 wt. %, 3.0 wt. % to 6.5 wt. %, 3.5 wt. % to 6.5 wt. %, 4.0 wt. % to 6.5 wt. %, or 4.0 wt. % to 6.0 wt. % of the IEL. In another embodiment, the second trap layer 26 may include transition metals at 0.3 to 3.5 wt. %, 0.5 to 3.5 wt. %, 0.5 to 3.0 wt. %, 0.5 to 2.5 wt. %, 0.5 to 2.0 wt. %, 0.5 to 1.5 wt. %, or 0.5 to 1.0 wt. % of the IEL. The transition metal(s) may include one or more of nickel, manganese, and copper. Stated as a percentage of the ion-exchange limit, the second trap layer 26 may include from 25% to 100% of the ion-exchange limit of the zeolite, or any sub-range therein. For example, the second trap layer 26 may include from 50% to 100%, 75% to 100%, 75% to 95%, 85% to 100%, 85% to 95%, 90% to 100%, 90% to 98%, 50% to 75%, 50% to 85%, or 50% to 90% of the ion-exchange limit. The percentages disclosed above may refer to a total amount of the transition metal(s) and/or it may refer to the occupation of the ion exchange sites by the transition metal(s). Depending on the method used for including the transition metal(s), a level higher than the ion-exchange limit may be introduced into the zeolite. In at least one embodiment, the amount of transition metal(s) introduced into the zeolite may be less than or equal to the ion-exchange limit. In one embodiment, the amount of transition metal(s) is less than the ion-exchange limit.

In one embodiment, the second trap layer 26 may be a nickel (Ni) and/or manganese (Mn) zeolite layer (e.g., zeolite with Ni and/or Mn exchanged or impregnated). The Ni and/or Mn zeolite layer may include only nickel and/or manganese, or substantially only nickel and/or manganese (e.g., less than 0.01 wt. % other elements) as substituted/added/exchanged elements or there may be additional elements (e.g., Cu). The zeolite may be any suitable zeolite type, such as those with pore dimensions capable of trapping the hydrocarbons and other emissions described herein. Examples of zeolite types may include beta, X, Y, Mordenite, ZSM-5, CHA, Ultra-Stable Y, or others. In one embodiment, the zeolite may be a beta zeolite. In one embodiment, the silica-alumina ratio of the zeolite may be from 25 to 50, or any sub-range therein, such as 30 to 45 or 35 to 40. In one embodiment, the silica-alumina ratio may be about 38.

The Ni and/or Mn zeolite layer may have a total Ni and/or Mn level (e.g., Ni, Mn, or Ni+Mn) that is at or below the ion-exchange limit (e.g., ≤100% of the ion-exchange limit). As described above, the ion-exchange limit (IEL) may vary depending on the properties of the zeolite, including the silica-alumina ratio. In one embodiment, the Ni and/or Mn level may be at or slightly below the IEL, such as from 50% to 100% of the IEL, or any sub-range therein. For example, the total Ni and/or Mn level may be from 60% to 100%, 70% to 100%, 80% to 100%, or 90% to 100% of the IEL. The Ni and/or Mn level may also be from any of the lower bounds in the previous ranges to slightly under the IEL, such as 95% or 99%. In absolute terms, the Ni and/or Mn level may be from 0.5 to 5.0 wt. % of the zeolite, or any sub-range therein. For example, Ni and/or Mn level may be from 0.5 to 4.5 wt. %, 0.5 to 4.0 wt. %, 1.0 to 4.0 wt. %, 1.5 to 4.0 wt. %, 1.5 to 3.5 wt. %, 2.0 to 4.0 wt. %, 2.0 to 3.5 wt. %, 2.5 to 4.0 wt. %, 3.0 to 4.0 wt. %, or 3.0 to 3.5 wt. %.

Similar to copper, the theoretical ion exchange limit of Ni in zeolite may be expressed as a percentage of the actual metal ions to Al in the zeolite on a per atom basis (metal actual/Al) relative to the maximum desired limit of metal load to Al in the zeolite (metal limit/Al). In one example, the limit of $Ni^{+1}$ in zeolite is Ni/Al=1.0, since it needs one Al—O⁻ exchange site. Expressing a zeolite in terms of structure code (e.g., BEA, MFI or FAU) followed by the $Si/Al_2$ ratio, then a theoretical ion-exchange limit (IEL) for nickel corresponds to 7.3 wt % in BEA25 and 4.7 wt. % in BEA40. Accordingly, a Ni/Al of 0.9, or 90% of the ion exchange limit, would correspond to 4.2 wt. % Ni in BEA40 and 6.6 wt. % Ni in BEA25.

Manganese can have several valence states (e.g., −3 to +7). In one embodiment, Mn may be added as $Mn^{+2}$, in which case it obeys the limits above for Cu (e.g., Mn/Al=0.5). However, Mn may also be added in other valence states. Based on $Mn^{+2}$, the theoretical Mn IEL corresponds to 3.4 wt. % in BEA25 and 2.2 wt. % in BEA40. It has been found that Mn added above this level may generate catalytic activity, and may change states to other oxides. Accordingly, a Mn/Al of 0.4, or 80% of the IEL, would correspond to 2.7 wt. % Mn in BEA25 and 1.8 wt. % in BEA 40. The differences in weight percentages between Cu and Mn may be explained based on the different atomic weights of the two elements. Calculations disclosed herein are based on Cu=63.546 (g/mol), Mn=54.938 (g/mol), $Al_2O_3$=101.96 (g/mol), $SiO_2$=60.1 (g/mol).

In embodiments where copper and another transition metal (e.g., Ni or Mn) are introduced into a single layer of zeolite, the total amount of transition metals introduced may be kept at or below the ion-exchange limit of copper (e.g., Cu/Al=0.5). For example, even though nickel has a higher ion-exchange limit than copper (e.g., Ni/Al=1.0), the total amount of copper plus nickel may be maintained at or below the copper IEL. This may ensure that the copper is not out-competed for the ion exchange sites in the zeolite. It has been discovered that loose copper (e.g., weakly bonded or un-bonded) may damage the TWC layer. Accordingly, by keeping the total metal below the Cu IEL, loose copper may be avoided.

Disposed over, overlying, or covering the second trap layer 26 may be a catalyst layer 28. The catalyst layer may be in overlying contact with the second trap layer 26. The catalyst layer may be a three-way catalyst (TWC) layer. TWCs are oxidation-reduction catalytic converters, which generally perform three functions—reduction of nitrogen oxides to nitrogen and oxygen, oxidation of carbon monoxide to carbon dioxide, and oxidation of unburnt hydrocarbons (HC) to carbon dioxide and water. TWCs are known in the art, and will not be described in detail. In general, TWCs include a ceramic or metallic substrate with an active layer including alumina, ceria and/or other oxides and one or more of the precious metals—platinum, palladium and rhodium.

Accordingly, FIG. 4 shows an embodiment of a HC-trap catalyst 20 including four layers—the substrate 22, a first trap layer 24, a second trap layer 26, and a catalyst (e.g., TWC) layer 28. In the embodiment shown and described, the first trap layer 24 may be a copper trap layer and the second trap layer 26 may include nickel and/or manganese. The copper trap layer is shown as directly contacting the substrate 22 on one side and the Ni/Mn trap layer on the other side. However, in another embodiment, the layer orders may be reversed. In addition fewer or more layers may be included with the same or different compositions. For example, there may be a single trap layer including any combination of Cu, Ni, and Mn, such as Cu and Ni, Cu and Mn, or Cu, Ni, and Mn. In another embodiment, there may be a third trap layer or more additional trap layers. In this embodiment, the third layer may have any of the above compositions. For example, if there are three trap layers, each may have zeolites including one of Cu, Ni, and Mn. In one embodiment, the first layer 24 may be a copper zeolite, the second layer 26 may be a nickel zeolite, and the third layer (not shown) may be a manganese zeolite. The order of these layers may be any possible order, such as switching the Ni and Mn layers. For reasons described in more detail below, multiple layers in the HC-trap catalyst 20 may improve the performance and/or longevity and robustness of the HC-trap catalyst 20.

With reference to FIG. 5, a HC-trap catalyst 30 (HCTC) is shown that does not include a substrate layer. Instead the first layer 32 may be an extruded zeolite layer. The first layer 32 may be similar to the first trap layer 24 described in FIG. 4 with respect to the zeolite type, the transition metal elements, and composition, and will therefore not be described again in detail. The first layer 32 may differ from the first trap layer 24 in that the first layer 32 is not supported on a separate substrate. The first layer 32 may be extruded as a blank zeolite (e.g., without the transition metal(s) added) or it may be extruded with the transition metal(s) present. If the zeolite is extruded without transition metals, they may be added to the zeolite afterward using any of the methods described above (e.g., ion-exchange or impregnation). If the zeolite is extruded with the transition metal(s) already present, then the transition metal(s) may be added to the pre-extrusion material directly into the slurry as a nitrate salt. Another process would be to add copper oxide powder in the slurry, which may require a solid state ion exchange by drying the mixtures in air at 520° to 800° C.

Disposed over or covering the first layer 32 may be a second layer 34. The second layer 34 may be similar to the second trap layer 26 described in FIG. 4 with respect to the zeolite type, the transition metal elements, and composition, and will therefore not be described again in detail. Disposed over or covering the second layer 34 may be a catalyst layer 36. The catalyst layer may be a three-way catalyst (TWC) layer. The catalyst layer 36 may be similar to the catalyst layer 28 described in FIG. 4 and will therefore not be described again in detail.

Accordingly, FIG. 5 shows an embodiment of a HC-trap catalyst 30 including three layers—a first layer 32, a second layer 34, and a catalyst (e.g., TWC) layer 36. In the embodiment shown and described, the first layer 32 may be a copper trap layer and the second layer 34 may include nickel and/or manganese. The copper trap layer is shown as the bottom layer with the Ni/Mn trap layer on one (top) side. However, in another embodiment, the layer orders may be reversed. In addition, fewer or more layers may be included with the same or different compositions. For example, there may be a single extruded trap layer including any combination of Cu, Ni, and Mn, such as Cu and Ni, Cu and Mn, or Cu, Ni, and Mn. In another embodiment, there may be a third trap layer or more additional trap layers. In this embodiment, the third layer may have any of the above compositions. For example, if there are three trap layers, each may have zeolites including one of Cu, Ni, and Mn. In one embodiment, the first layer 32 may be a copper zeolite, the second layer 34 may be a nickel zeolite, and the third layer (not shown) may be a manganese zeolite. The order of these layers may be any possible order, such as switching the Ni and Mn layers. For reasons described in more detail below, multiple layers in the HC-trap catalyst 30 may improve the performance and/or longevity and robustness of the HC-trap catalyst 30.

As described above, a trap layer in the disclosed HC-trap catalysts may include more than one transition metal. It has been discovered that the order of adding/impregnating/inserting the transition metals may have a significant impact on the performance of the catalyst. For example, it has been discovered that introducing copper before other transitional metals may provide improved performance of the HC-trap catalyst. If multiple transition metals are introduced simultaneously into the zeolite (e.g., through ion-exchange), the metals compete for the ion-exchange sites. It has been discovered that certain metals may out-compete others for the ion-exchange sites, which may result in unintended or unfavorable composition of the zeolite. For example, it has been found that it may be beneficial to add copper before other transition metals, such as manganese or nickel. Accordingly, in one embodiment, if there are multiple transition metals introduced into a zeolite, they may be introduced one at a time. If copper is introduced into the zeolite, it may be introduced first, or at least prior to at least one other metal (e.g., Mn or Ni).

Figure 6:
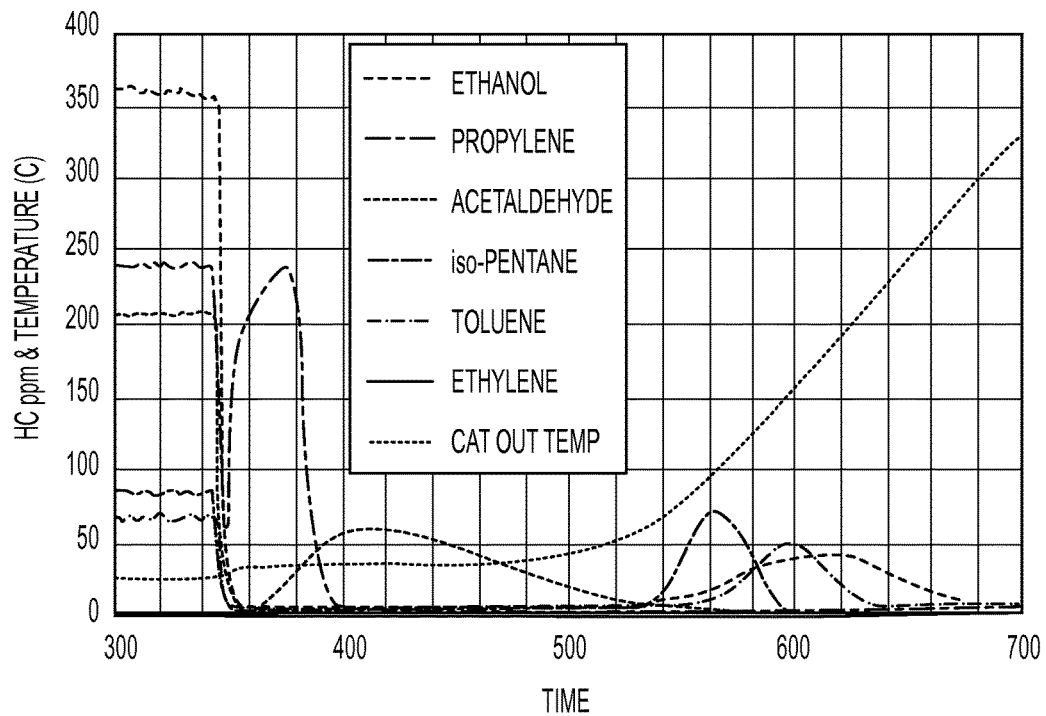
FIG. 6 is a plot of HC adsorption and desorption as a function of time and temperature for a blank zeolite, according to an embodiment.
Figure 7:
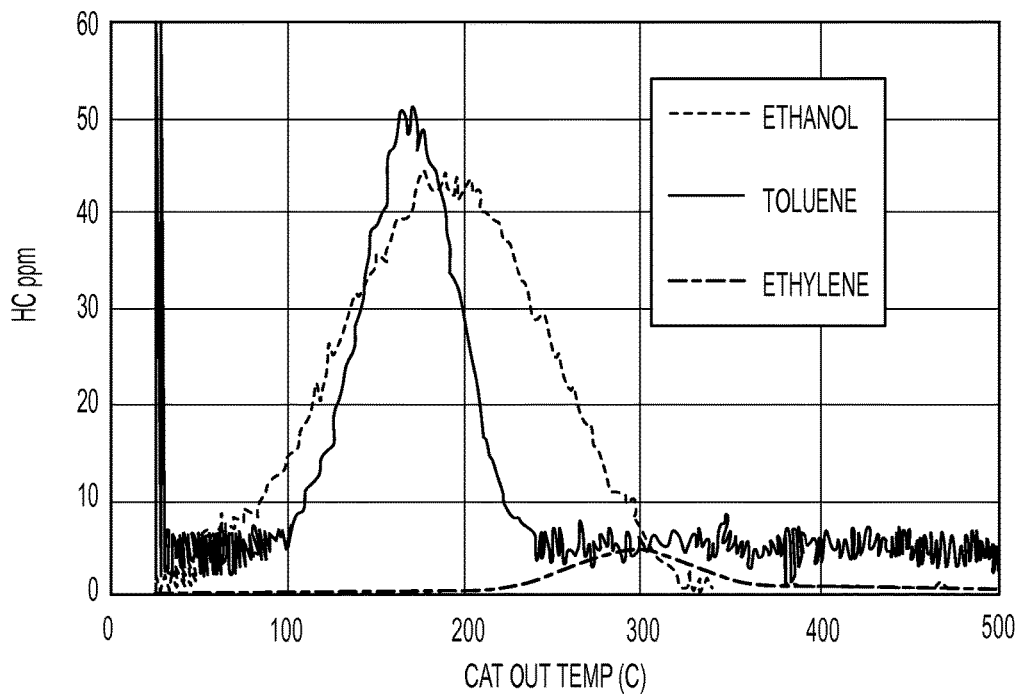
FIG. 7 is a plot of HC desorption as a function of temperature for a blank zeolite, according to an embodiment.

With reference to FIGS. 6-29, examples and test data regarding embodiments of HC-trap catalysts are described. With reference to FIGS. 6 and 7, adsorption and desorption of several hydrocarbons (HCs) are shown for blank BETA zeolite having a silica-alumina ratio of 38. BETA type zeolite has been found to be a suitable HC trap material since its molecular "cages" may have appropriate sizes to house/trap certain HC molecules of interest (e.g., ethanol, propylene, toluene, ethylene, iso-pentane). A lab test was conducted to evaluate the HC adsorption capability and desorption performance by introducing an HC mixture (ethanol, acetaldehyde, propylene, iso-pentane and toluene) and 6% water into the trapping material for 30 seconds and then ramping up the trapping material temperature to measure the HC desorption. The first goal of the HC trap is to adsorb the relevant hydrocarbons at room temperature as efficient as possible and with high capacity. The second goal is to desorb the stored hydrocarbons at the highest temperature possible so that a corresponding TWC layer is active enough to convert them.

FIG. 6 shows the adsorption and desorption of HCs with BETA38 HC trap material. The graph shows that the zeolite can adsorb all ethanol, toluene and iso-pentane at room temperature and release ethanol, ethylene (e.g., due to dehydration of ethanol), toluene and iso-pentane when the temperature ramps up. Propylene and acetaldehyde were partially adsorbed and released before the temperature ramp up. The test results showed that iso-pentane and acetaldehyde were released at relatively low temperatures. FIG. 7 shows that most of the toluene and ethanol were released before 200° C. This may result in a relatively low HC conversion, since TWCs typically have very limited activity under 200° C.

Figure 8:
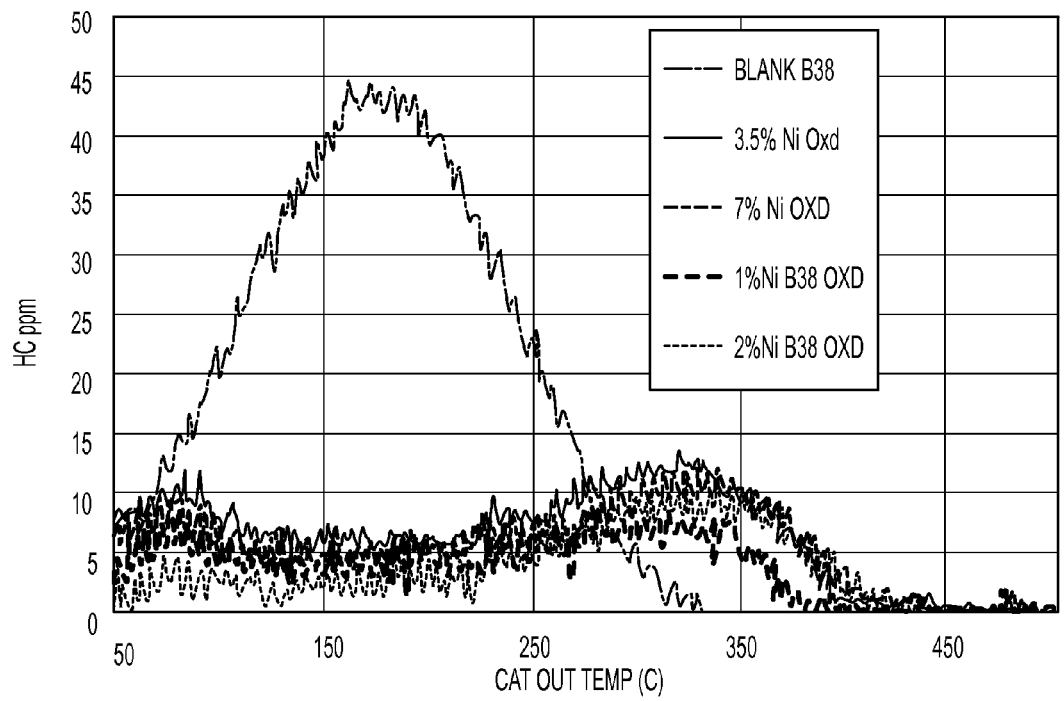
FIG. 8 is a plot of ethanol desorption as a function of temperature for nickel zeolites, according to an embodiment.
Figure 9:
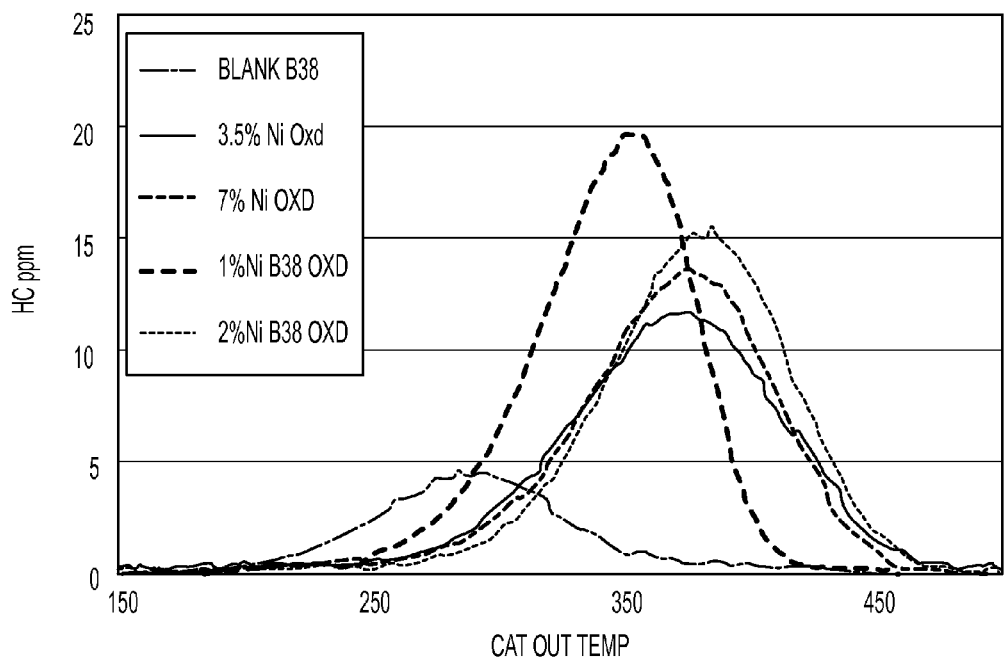
FIG. 9 is a plot of ethylene generation as a function of temperature for nickel zeolites, according to an embodiment.

With reference to FIGS. 8 and 9, the impact of nickel on ethanol conversion was investigated. It was found that nickel was helpful for the improvement of ethanol conversion. FIG. 8 and FIG. 9 show the ethanol desorption and ethylene generation after adding various levels of Ni into zeolite. Ethanol was fully adsorbed at room temperature for all cases. Compared with blank BETA38 zeolite alone, the Ni added zeolite released much less ethanol at low temperatures and generated more ethylene at high temperatures. All ethylene was generated above 250° C. and more than half of ethanol was released above 250° C. Accordingly, it was found that the conversion of ethanol during cold start can be increased significantly with the addition of nickel.

Relatively, the zeolite with 2.0 wt % Ni released the least amount of ethanol at low temperatures and generated ethylene at higher temperatures than the other materials. Accordingly, a loading of about 2 wt % may be an effective Ni loading on BETA38 for achieving improved ethanol performance. For example, Ni loading may be from 1.5 wt % to 2.5 wt %, 1.75 wt % to 2.25 wt %, or about 2.0 wt % (e.g., ±0.1 wt %). A loading of about 2 wt % corresponds to the approximate ion-exchange level for $Ni^+$ in the BETA38 zeolite. Since ethanol is a major cold start HC species for E85 fueled engines, a Ni-zeolite may be effective for E85 applications. Ni added to BETA38 zeolite did not have as significant an impact on the adsorption and desorption characteristics of toluene and propylene. As a result, the Ni-zeolite may be less effective for E10 applications.

Figure 10:
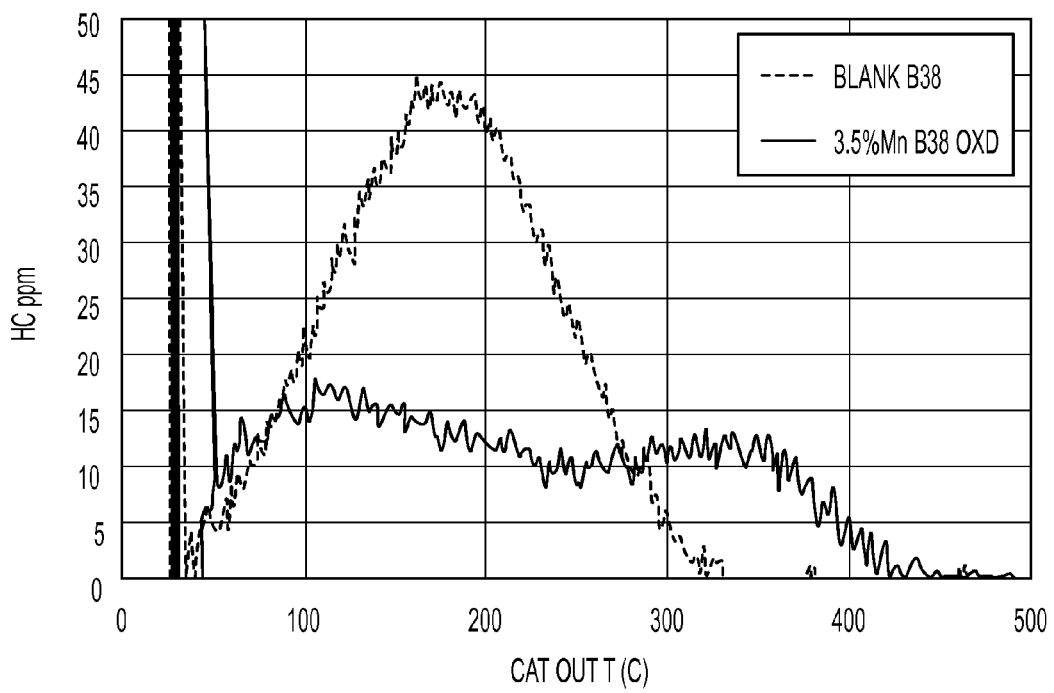
FIG. 10 is a plot of ethanol desorption as a function of temperature for a manganese zeolite, according to an embodiment.
Figure 11:
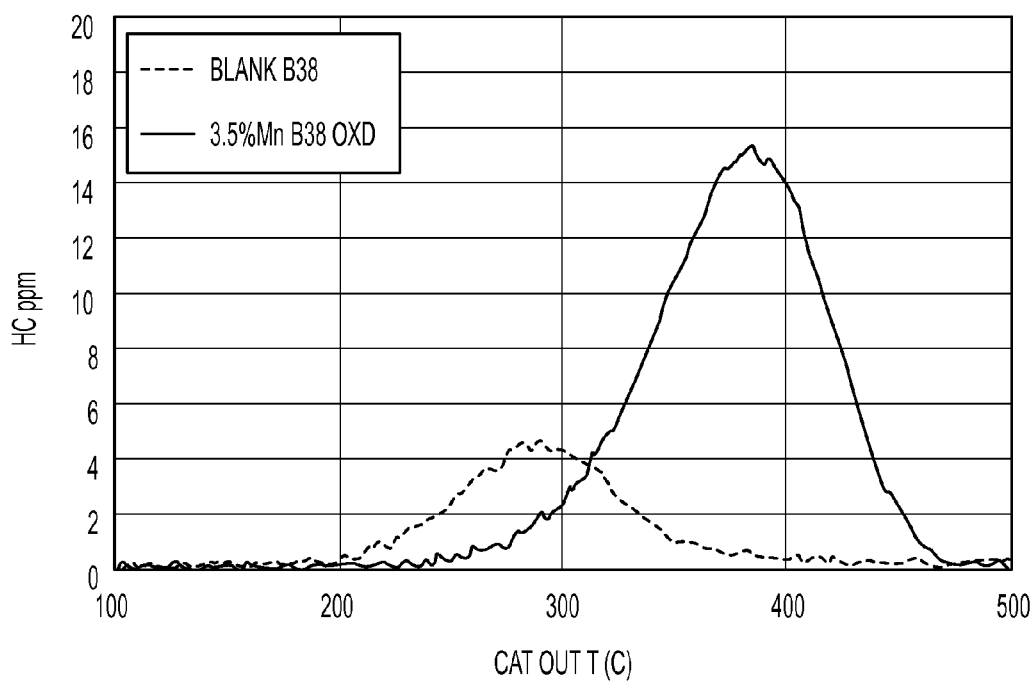
FIG. 11 is a plot of ethylene generation as a function of temperature for a manganese zeolite, according to an embodiment.

With reference to FIGS. 10 and 11, the impact of manganese on ethanol conversion was investigated. It was found that manganese was helpful for the improvement of ethanol conversion. FIG. 10 and FIG. 11 show the ethanol desorption and ethylene generation after adding Mn into zeolite. Mn was found to have a similar impact on ethanol desorption as Ni. FIG. 10 and FIG. 11 compare the ethanol desorption and ethylene generation between blank BETA38 zeolite and BETA Zeolite with 3.5 wt % Mn. As shown, adding Mn to BETA zeolite reduced the ethanol release at low temperatures and generated ethylene at higher temperatures, thus improving the potential overall conversion of cold start HC (e.g., when it passes over the TWC layer).

Figure 12:
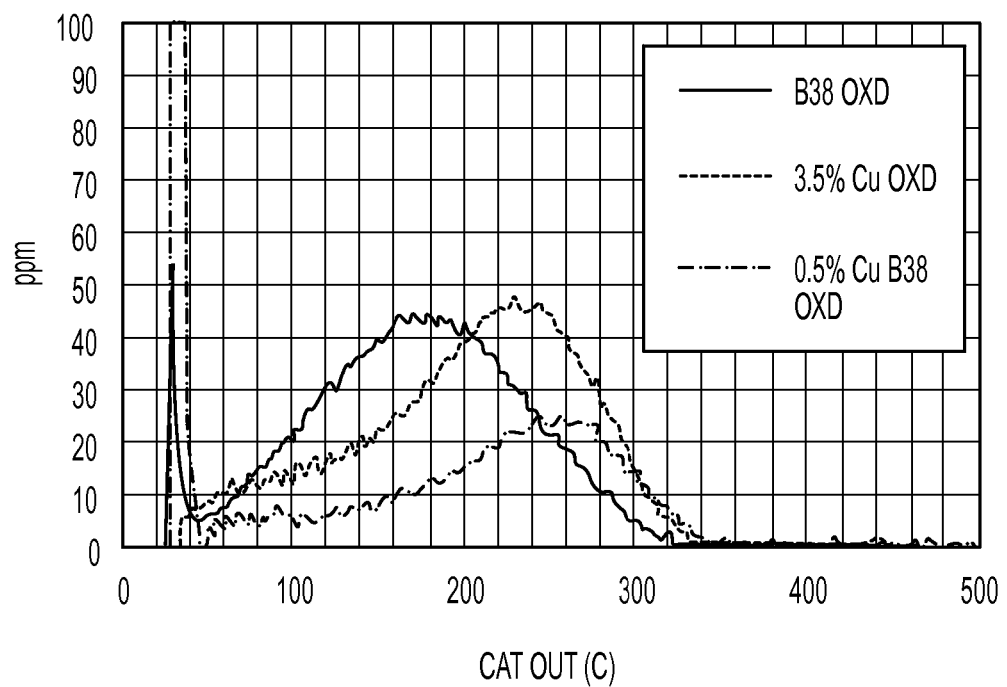
FIG. 12 is a plot of ethanol desorption as a function of temperature for copper zeolites, according to an embodiment.
Figure 13:
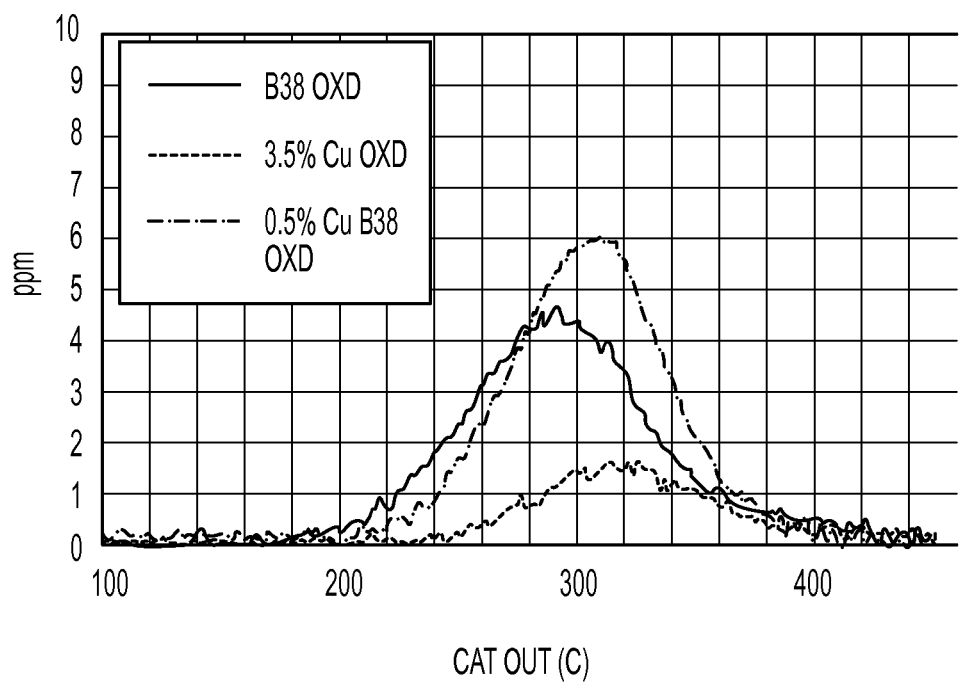
FIG. 13 is a plot of ethylene generation as a function of temperature for copper zeolites, according to an embodiment.

The introduction of copper into zeolite was also investigated. Copper was found helpful for improving the performance of ethanol, propylene and toluene. With reference to FIGS. 12 and 13, the impact of copper on ethanol conversion was investigated. It was found that copper was helpful for the improvement of ethanol conversion. FIG. 12 and FIG. 13 compare the release profiles of ethanol and ethylene between blank zeolite and Cu added zeolites (0.5 wt % Cu and 3.5 wt % Cu). As shown, Cu-added zeolite reduced the low temperature ethanol release and increased the temperature of ethylene generation. The 0.5 wt % Cu zeolite performed better than 3.5 wt % Cu zeolite by having a higher ethanol desorption temperature and by generating more ethylene and at a higher temperature. This may be due to having more residual Brønsted acid sites (replaced by Cu) to perform the ethanol dehydration reaction.

Figure 14:
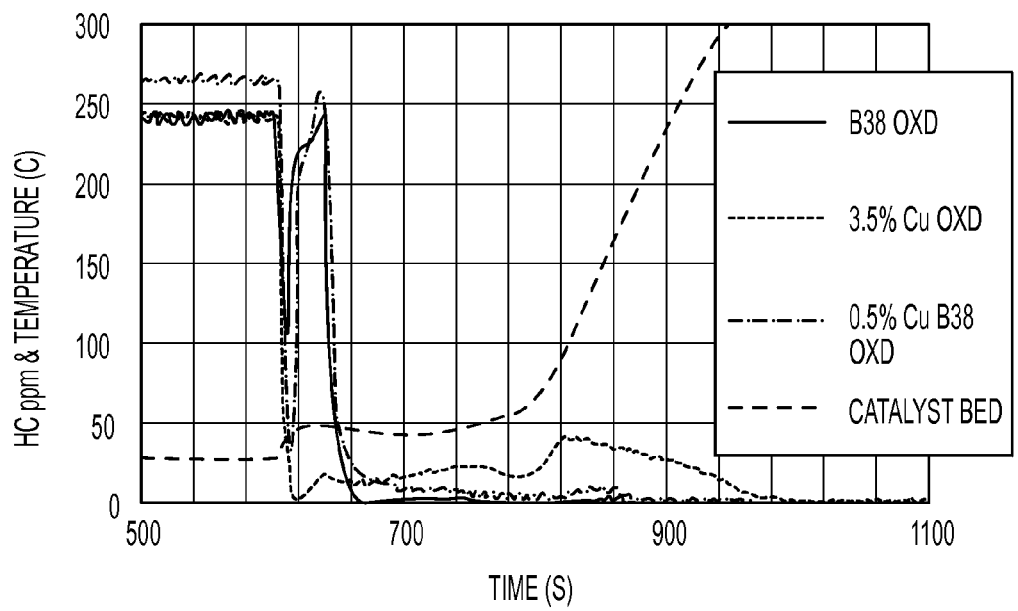
FIG. 14 is a plot of propylene adsorption as a function of time and temperature for copper zeolites, according to an embodiment.
Figure 15:
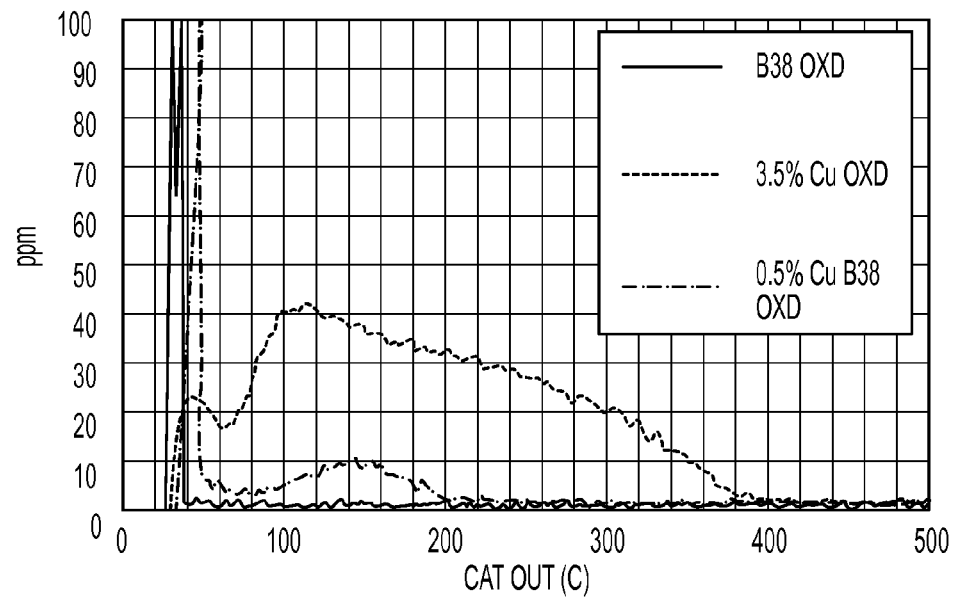
FIG. 15 is a plot of propylene desorption as a function of temperature for copper zeolites, according to an embodiment.

With reference to FIGS. 14 and 15, the adsorption and desorption of propylene with Cu added zeolites is shown. The 3.5% Cu in zeolite was found to significantly promote the adsorption of propylene and retain a considerable amount of propylene above 200° C. The 0.5% Cu added zeolite showed a benefit for propylene compared with blank zeolite.

Figure 16:
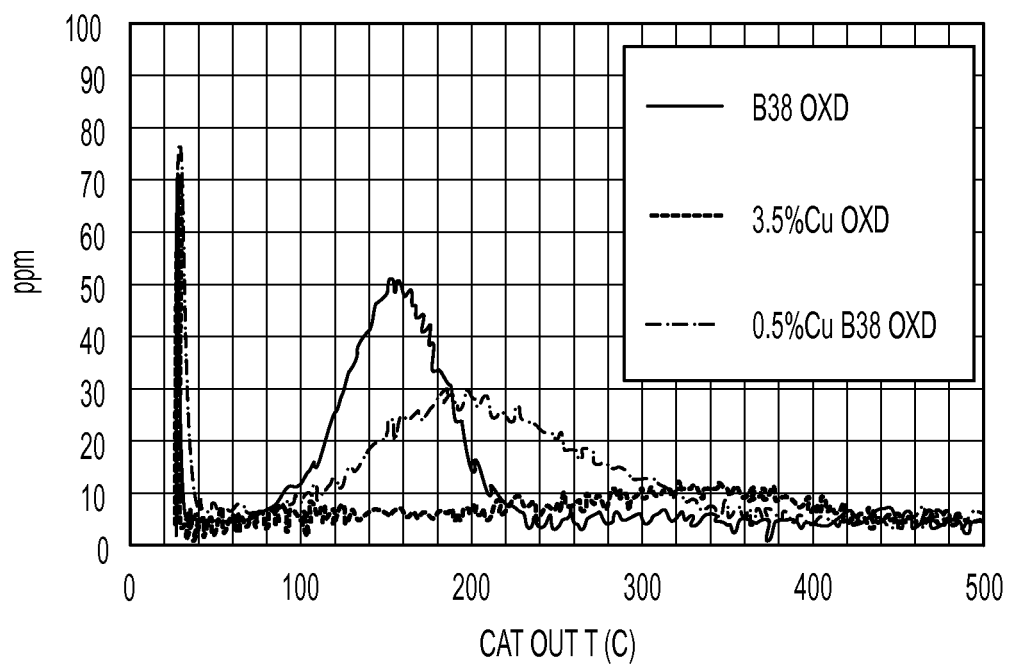
FIG. 16 is a plot of toluene desorption as a function of temperature for copper zeolites, according to an embodiment.

With reference to FIG. 16, the desorption of toluene during the temperature ramp up is shown. In addition to propylene, the Cu-added zeolites were also found to hold toluene to higher temperatures than blank zeolite. The 3.5% Cu added zeolite did not release most of its adsorbed toluene during ramp up. The adsorbed toluene was either oxidized during ramp up, or formed coke which can be cleaned up at higher temperatures with the presence of oxygen. Either way, it was shown that the conversion of cold start toluene may be improved substantially with the addition of Cu to zeolite.

Figure 17:
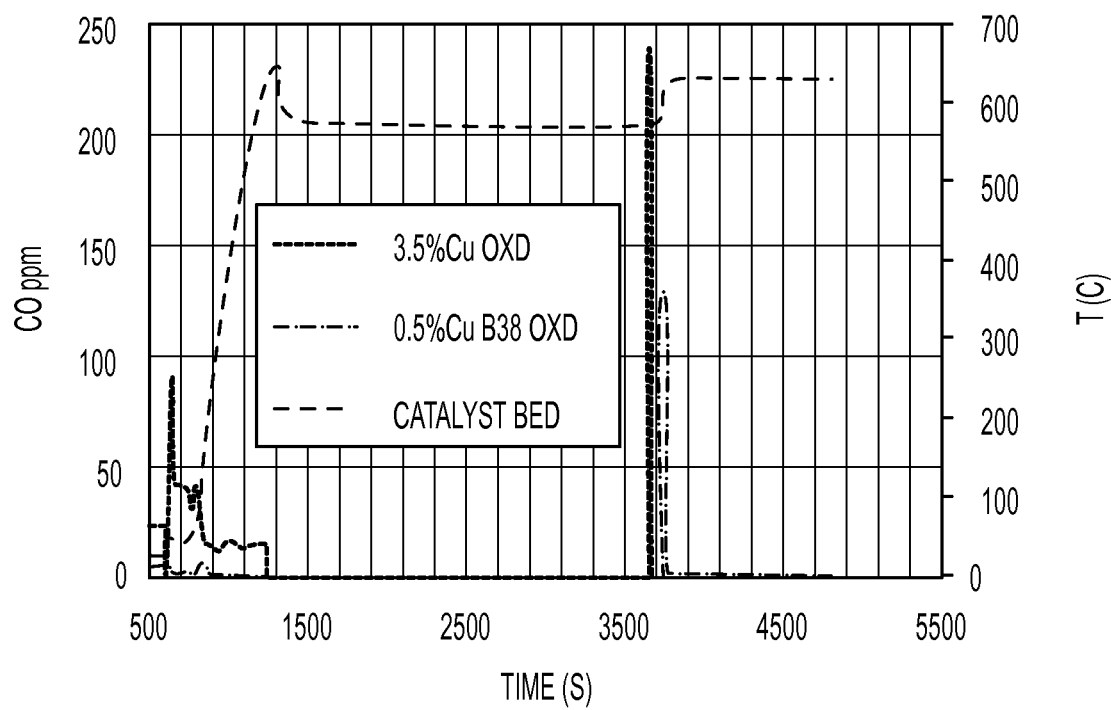
FIG. 17 is a plot of CO generation as a function of time and temperature for copper zeolites, according to an embodiment.
Figure 18:
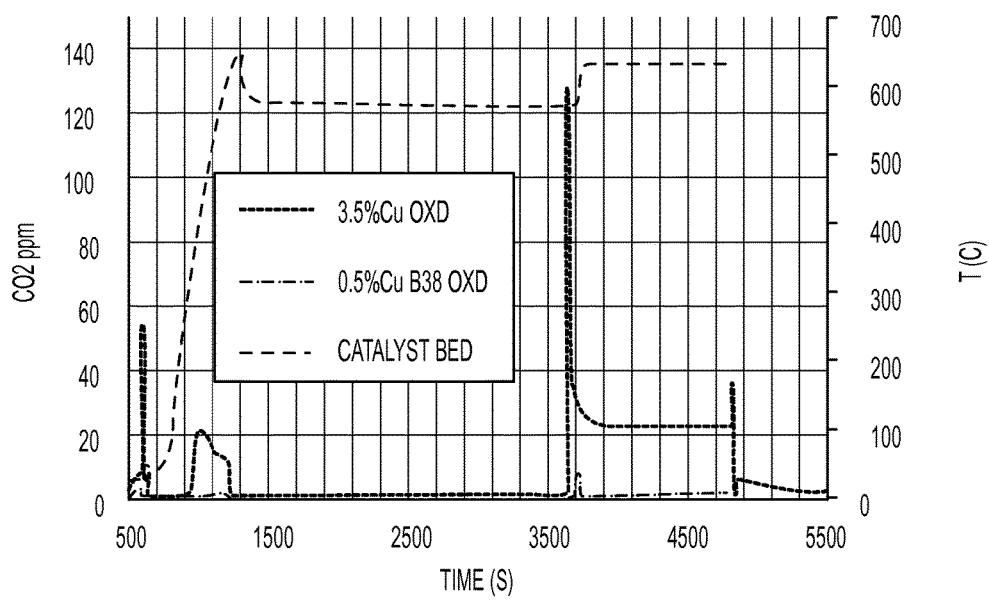
FIG. 18 is a plot of $CO_2$ generation as a function of time and temperature for copper zeolites, according to an embodiment.

With reference to FIGS. 17 and 18, CO and $CO_2$ generation during temperature ramp up and clean up (650° C., with O2) are shown. The graphs show that more CO and $CO_2$ were generated for 3.5% Cu-added zeolite than for 0.5% Cu-added zeolite.

The data described above shows that the individual type of transition metal and the amount of transition metal have unique adsorption/desorption characteristics on various hydrocarbon types. It was additionally found that the addition of two or more transitions metals can interfere with each other and, therefore, certain preparation conditions may result in greater benefits than others. It was found that there are a fixed number of ion-exchange sites on the zeolite and that the transition metals compete for them.

Figure 19:
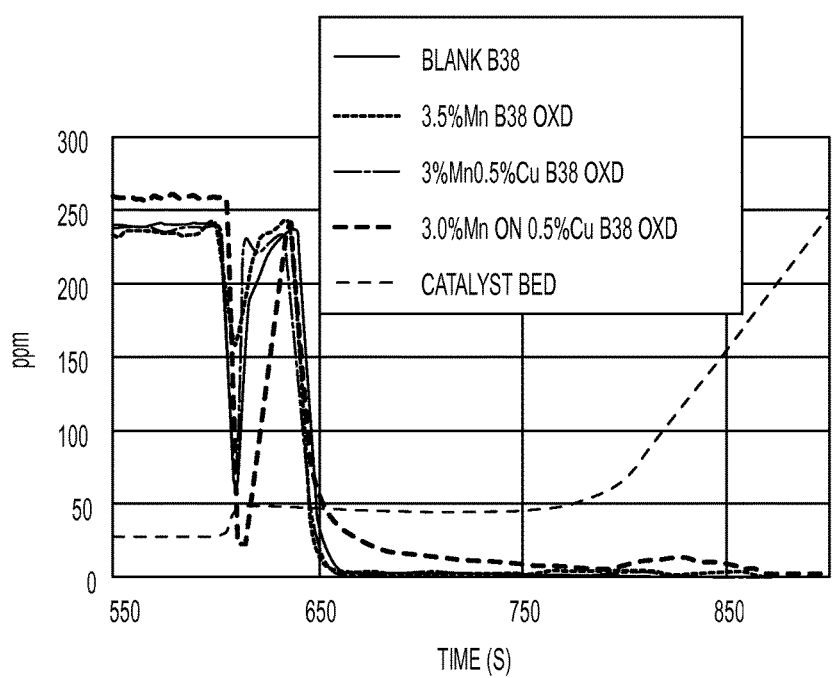
FIG. 19 is a plot of propylene adsorption and desorption as a function of time and temperature for several transition metal zeolites, according to an embodiment.
Figure 20:
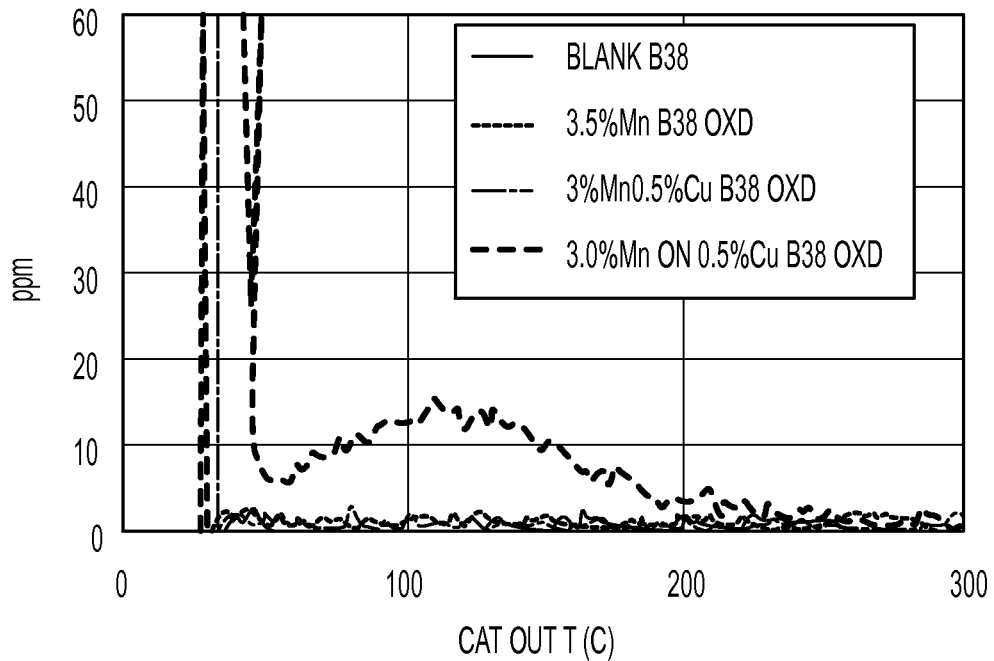
FIG. 20 is a plot of propylene desorption as a function of temperature for several transition metal zeolites, according to an embodiment.
Figure 21:
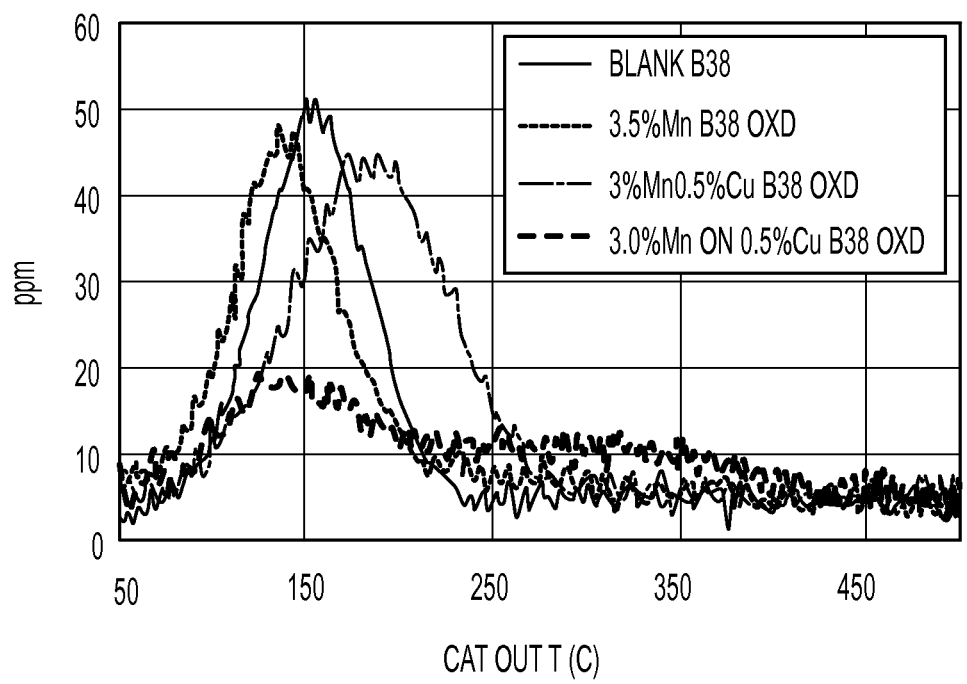
FIG. 21 is a plot of toluene desorption as a function of temperature for several transition metal zeolites, according to an embodiment.

With reference to FIGS. 19-21, adsorption data for propylene and toluene and desorption data for propylene are shown. The results show improved performance may be achieved if Cu is added to the zeolite first and calcined first before a second transition metal, such as Mn or Ni, is added. If the Cu and Mn/Ni are added simultaneously, a higher fraction of the ion-exchange sites will be occupied by Mn/Ni instead of Cu. Therefore, the overall benefit from Cu may be diminished.

The evaluation tests described above indicated that Ni and Mn may improve the potential conversion of ethanol, while Cu may improve the potential conversion of toluene and propylene. Generally, Ni and Mn were more effective than Cu for improving ethanol retention. For vehicles capable of using "flex fuel," it may be beneficial for the HC trap material to function across the range between E10 and E85 fuels. Accordingly, it has been found that a combination of transition metals may be introduced into the zeolite to handle multiple HCs, such as ethanol, toluene and propylene.

FIGS. 19-21 compare the propylene and toluene adsorption and desorption for various samples, including 1) No metal zeolite 2) 3.5% Mn on zeolite 3) 3.0% Mn and 0.5% Cu on zeolite (Mn and Cu added simultaneously) 4) 3.0% Mn on 0.5% Cu/zeolite (0.5% Cu added to zeolite first followed by 3.0% Mn). As described above, it has been found that Cu added to zeolites may have a benefit for propylene and toluene adsorption/desorption characteristics. FIGS. 19-21 surprisingly demonstrate that sample (4), where Cu is added to the zeolite first with the Mn second (rather than simultaneous), performs substantially better. Even with the same amount of Mn and Cu (3% Mn and 0.5% Cu), the sample with 0.5% Cu added first and 3.0% Mn added later shows greater benefit for propylene and toluene than the sample with Cu and Mn added simultaneously.

Figure 22:
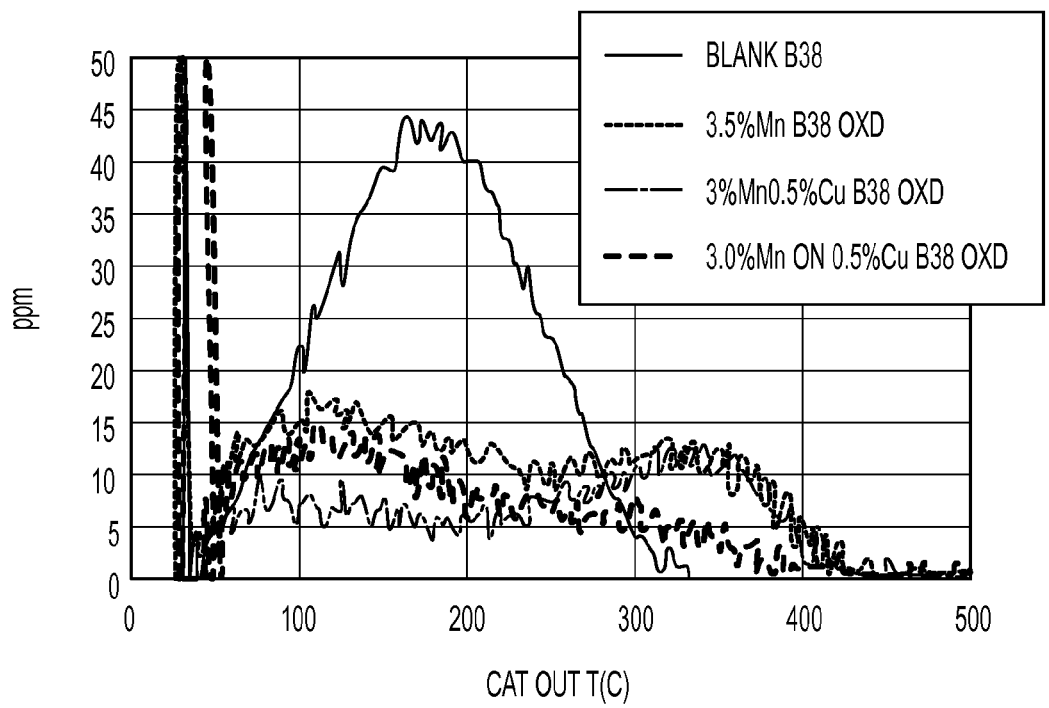
FIG. 22 is a plot of ethanol desorption as a function of temperature for several transition metal zeolites, according to an embodiment.
Figure 23:
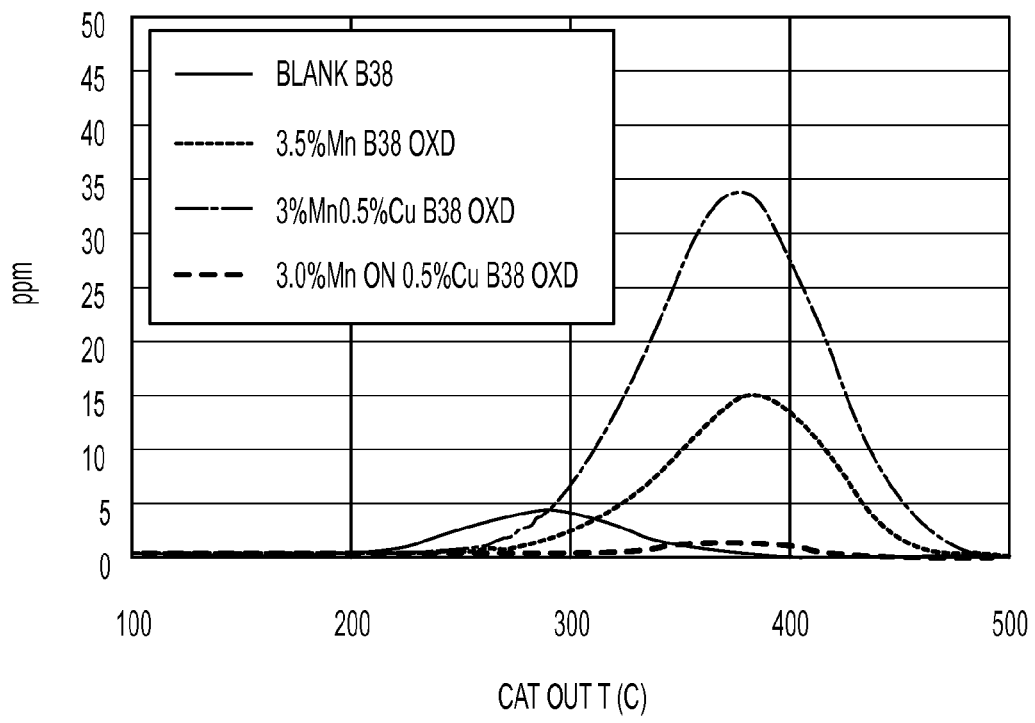
FIG. 23 is a plot of ethylene generation as a function of temperature for several transition metal zeolites, according to an embodiment.
Figure 24:
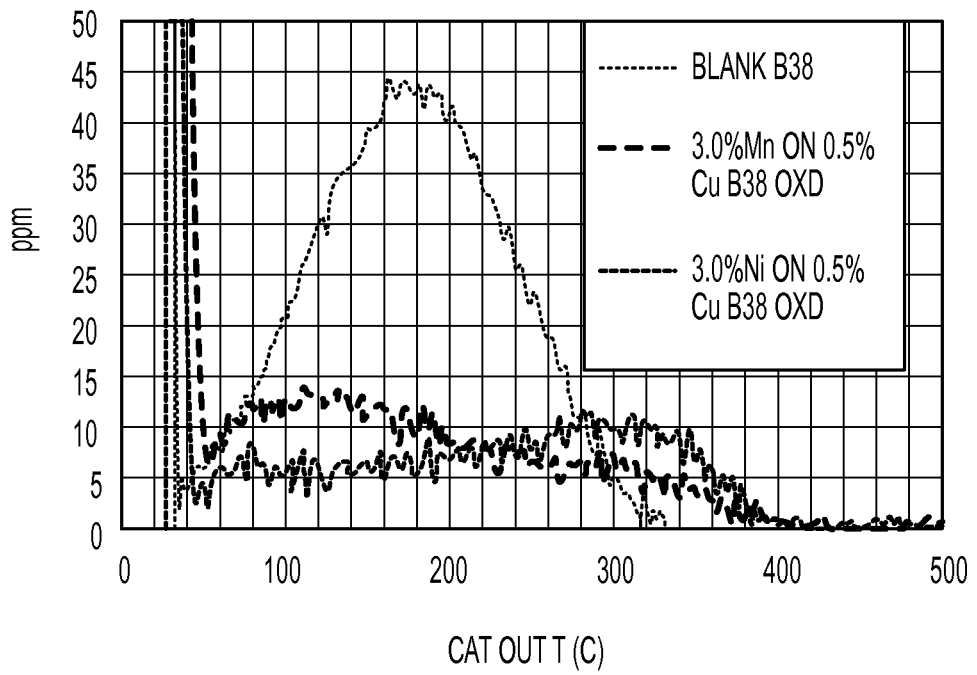
FIG. 24 is a plot of ethanol desorption as a function of temperature for Mn/Cu and Ni/Cu zeolites, according to an embodiment.
Figure 25:
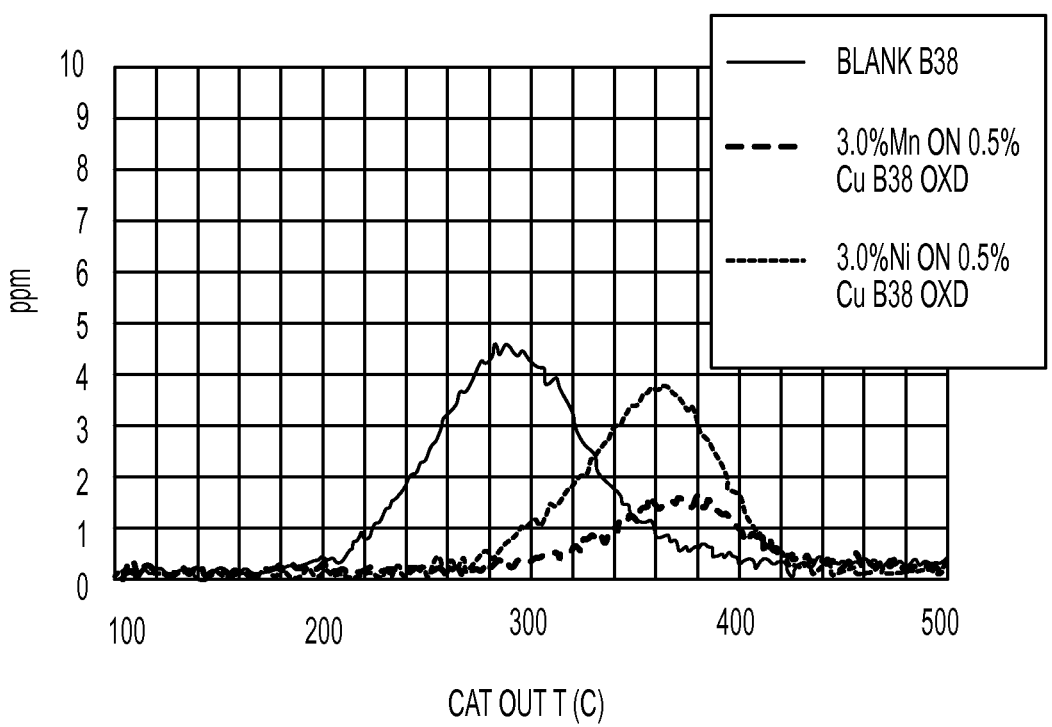
FIG. 25 is a plot of ethylene generation as a function of temperature for Mn/Cu and Ni/Cu zeolites, according to an embodiment.
Figure 26:
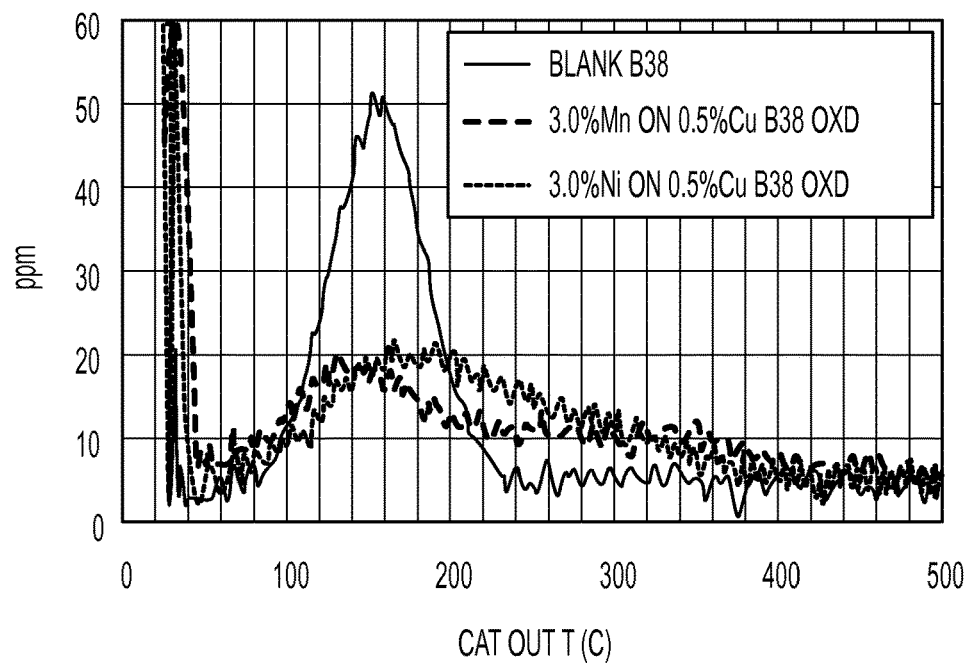
FIG. 26 is a plot of toluene desorption as a function of temperature for Mn/Cu and Ni/Cu zeolites, according to an embodiment.
Figure 27:
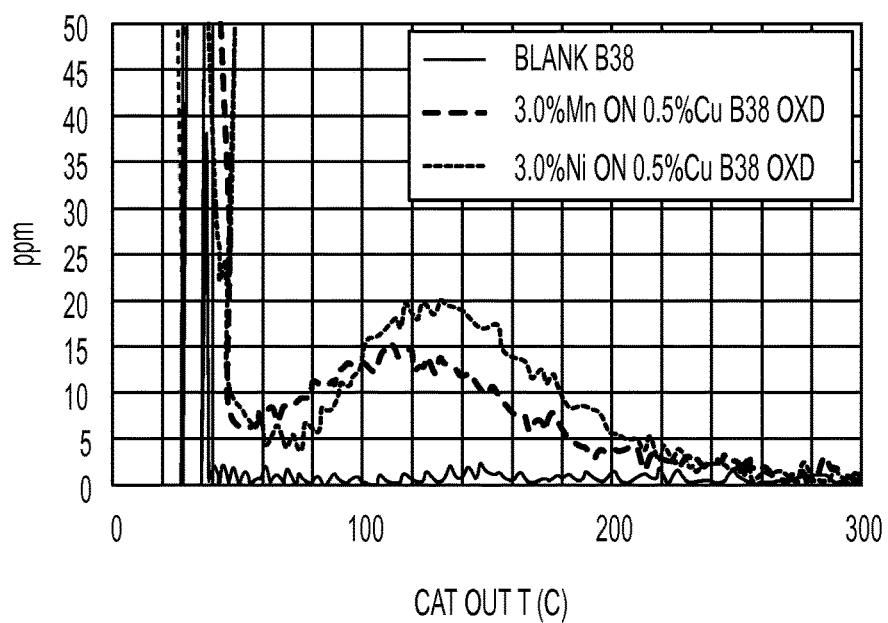
FIG. 27 is a plot of propylene desorption as a function of temperature for Mn/Cu and Ni/Cu zeolites, according to an embodiment.

FIGS. 22-23 show the desorption of ethanol and ethylene for the same samples from FIGS. 19-21. The samples with Mn and Mn plus Cu show better performance for ethanol than blank zeolite. The sample with 3.0% Mn and 0.5% Cu added simultaneous released the least amount of ethanol at low temperature and produced most ethylene at high temperature. This data indicates that not only the amount of metals, but also the method of adding metals to zeolite, can have an impact on the performance of HC adsorption and desorption.

The above tests indicated that Cu is effective at holding toluene and propylene to a higher temperature and Ni and Mn are effective for holding ethanol to a higher temperature. Also, that if Cu is used with another metal, it may be more beneficial to add Cu first before adding another metal, in order to maintain the benefits of Cu for toluene and propylene. In order to formulate a single HC trap for both E85 and E10, more than one transition metal may be needed in the catalyst design. To reduce cold start HC emissions for vehicles with either E85 fuel or E10 fuel, samples were prepared and compared to determine if a Cu/Ni/zeolite design or Cu/Mn/zeolite was more effective. For both samples, 0.5% Cu was added to the zeolite first, then 3% Ni was added to one sample and 3% Mn was added to another sample. Accordingly, the following samples were tested: 1) Blank zeolite reference 2) 0.5% Cu followed by 3.0% Ni on zeolite 3) 0.5% Cu followed by 3.0% Mn on zeolite.

FIGS. 24-27 show the desorption of ethanol, propylene, and toluene and generation of ethylene. Compared with the blank zeolite, zeolites with Cu/Mn and Cu/Ni showed improved adsorption retention over the baseline zeolite alone. The transition metal addition released lower ethanol, ethylene and toluene at the undesirable lower temperatures. Overall, the zeolite with Cu/Ni showed the most improved retention capability.

Figure 28:
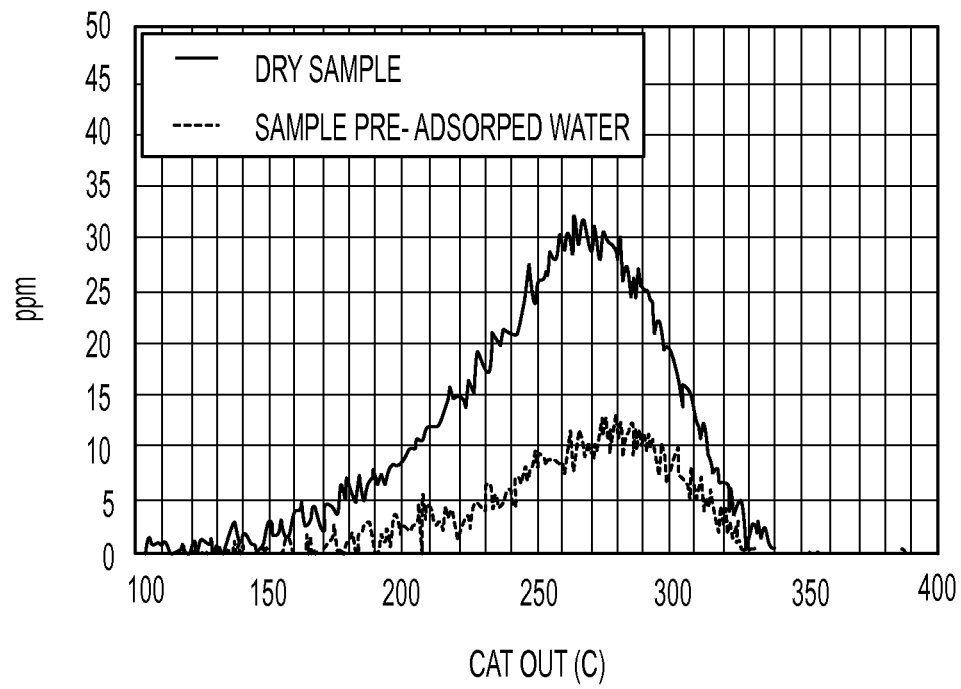
FIG. 28 is a plot of ethanol desorption as a function of temperature for a dry and a pre-wetted blank zeolite, according to an embodiment.
Figure 29:
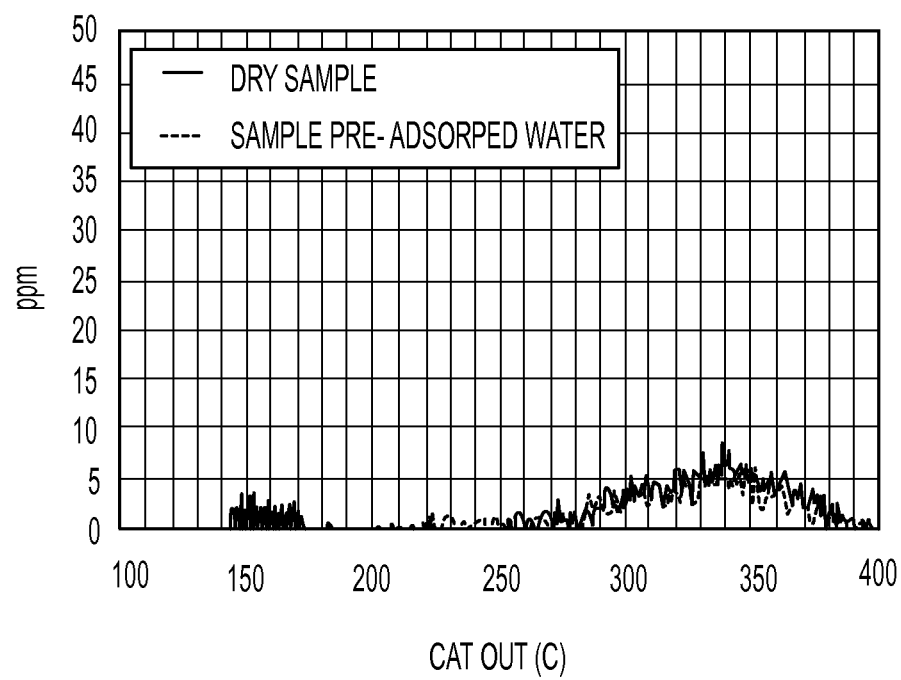
FIG. 29 is a plot of ethanol desorption as a function of temperature for a dry and a pre-wetted nickel zeolite, according to an embodiment.

BETA zeolite is generally hydrophilic, and the presence of water can potentially compete with HCs for the adsorption sites. This typically leads to the release of HCs at lower temperatures, thus reducing the cold start HC conversion potential. Evaluation tests show that adding transition metals can also reduce the impact of water on HC desorption. FIGS. 28-29 compare the ethanol desorption between blank zeolite and zeolite with Ni added. For the blank zeolite (FIG. 28), when the sample was pre-treated by gas with the ambient level temperature and humidity, more ethanol was released at low temperature than sample that was dry before the test. For Ni-added zeolite (FIG. 29), the pretreatment has only a minor impact on the ethanol desorption. A similar impact was also found for Cu-added zeolite. Generally, pre-adsorbed water has less impact on the desorption of toluene and propylene. Accordingly, it has also been surprisingly found that transition metal additives to the zeolite reduce the negative impact of water on hydrocarbon retention on zeolite alone.

Accordingly, the disclosed HC-trap catalysts reduce cold start HC emissions by adding transition metals into zeolite. The blank zeolite may trap some HCs at room temperature, but the HC release temperature is too low for a good conversion over the TWC outer layer. The disclosed examples show that zeolites with transition metals can hold some HC species to higher temperatures than blank zeolite. The HC stored on zeolite can then be oxidized by a TWC during warm up, converted by steam reforming reactions, or cleaned at high temperatures with the presence of oxygen gas phase or stored oxygen.

It has been found that adding Ni to zeolite can significantly increase the release temperature of ethanol, and thus may be particularly useful for reducing the vehicle cold start HC tailpipe emissions for E85-type fuel. The amount of Ni in the zeolite may be near the ion-exchange limit (e.g., about 2-3 wt % for zeolites having silica/alumina ratios around 38). In one embodiment, the amount of Ni may not exceed the ion-exchange limit.

It has been found that adding Mn to zeolite can also significantly reduce the cold start HC emission for E85-type fuel. The amount of Mn in the zeolite may also be near the ion-exchange limit. In one embodiment, the amount of Mn may not exceed the ion-exchange limit.

It has been found that adding Cu to zeolite can significantly increase the release temperature of ethanol, propylene and toluene, and thus reduce the vehicle cold start HC tailpipe emission. The addition of Cu may be particularly useful for cold state HC tailpipe emissions for E10-type fuel, although it may be useful for E85 or other fuels, as well. The amount of Cu added to zeolite may be around 50-75% of the ion-exchange level. Higher levels of Cu may degrade the zeolite structure, and could result in diminishing returns. Accordingly, there may be an optimal or maximum Cu level.

If multiple metals are introduced into a zeolite, it has been found that multiple metals may allow targeting of specific hydrocarbons by optimizing the metal type and amount. It has been discovered that adding Cu first and calcining it before adding a secondary metal (e.g., Ni or Mn) may be beneficial. Introducing certain metal combinations into the zeolites may allow one HC trap catalyst to cover both E10 and E85 engines.

If a zeolite is to be targeted for an E10 fuel type, it has been found that a Cu/zeolite formulation may target mainly alkenes such as propylene and toluene. If a zeolite is to be targeted for an E85 fuel type, it has been found that a Ni/zeolite and/or Mn/zeolite formulation may target mainly alcohols such as ethanol. It has been found that BETA zeolite having silica/alumina ratio between 25-50 may be beneficial.

Since Cu may have negative impact on the performance of the TWC that is used to convert HCs, several HC trap catalyst structures are disclosed. If the zeolite is coated on a standard substrate (e.g., cordierite), the first layer may be Cu-added zeolite. Then, another layer of zeolite may be coated on top of the first layer and Ni or Mn may be present in or added/introduced to the 2nd layer of zeolite. The TWC layer can then be coated on top of the 2nd zeolite layer. Accordingly, Cu is separated from TWC, but still provides the benefit of holding toluene and propylene to higher temperatures.

If the zeolite is extruded, the Cu can be added to the extruded zeolite substrate to form the first layer. Then, a second layer of zeolite can be coated on the extruded substrate with Ni and/or Mn added. A TWC may then be coated on top of the 2nd layer of zeolite coating. Accordingly, the Cu layer is again separated from the TWC, but still provides the benefit of holding the HC to higher temperatures.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hydrocarbon trap catalyst, comprising:
   a first zeolite layer of a first zeolite material and including copper present at 15% to 75% of an ion-exchange level of the first zeolite material;
   a second zeolite layer of a second zeolite material and including at least one of nickel and manganese present at 50% to 100% total of an ion-exchange level of the second zeolite material; and
   a three-way catalyst layer,
   the first and second zeolite materials are zeolites beta having a 3-D network of 12-ring pores and a silica-alumina ratio of 25 to 50.

2. The hydrocarbon trap catalyst of claim 1, wherein the first and second zeolite materials are the same beta zeolite material.

3. The hydrocarbon trap catalyst of claim 1, wherein the copper occupies 20% to 50% of a total number of ion-exchange sites of the first zeolite material and the at least one of nickel and manganese occupies a total of 50% to 100% of a total number of ion-exchange sites of the second zeolite material.

4. They hydrocarbon trap catalyst of claim 1 further comprising a substrate, the first zeolite layer overlying the substrate.

5. The hydrocarbon trap catalyst of claim 1, wherein the first zeolite layer is an extruded zeolite layer.

6. The hydrocarbon trap catalyst of claim 1, wherein the copper is present in the first zeolite layer at 30% to 50% of the ion-exchange level of the first zeolite material.

7. The hydrocarbon trap catalyst of claim 1, wherein the at least one of nickel and manganese is present in the second zeolite layer at 85% to 100% total of the ion-exchange level of the second zeolite material.

8. The hydrocarbon trap catalyst of claim 1, wherein the second zeolite layer includes only one of nickel and manganese.

9. The hydrocarbon trap catalyst of claim 1, wherein the first zeolite material and the second zeolite material are beta zeolites having a silica-alumina ratio of 30 to 45.

10. The hydrocarbon trap catalyst of claim 1, wherein the second zeolite layer is in overlying contact with the first zeolite layer and the three-way catalyst layer is in overlying contact with the second zeolite layer.

11. A method of forming a hydrocarbon trap catalyst, comprising:
    introducing copper into a zeolite at 10% to 75% of an ion-exchange level of the zeolite;
    introducing at least one of nickel and manganese into a zeolite at 50% to 100% total of an ion-exchange level of the zeolite; and
    applying a three-way catalyst layer overlying the zeolite including copper and the zeolite including at least one of nickel and manganese,
    the zeolites are beta zeolites having a 3-D network of 12-ring pores and a silica-alumina ratio of 25 to 50.

12. The method of claim 11, wherein the copper and the at least one of nickel and manganese are introduced into a single zeolite, and the copper is introduced prior to the at least one of nickel and manganese.

13. The method of claim 11, wherein the copper is introduced into a first zeolite layer; the at least one of nickel and manganese is introduced into a second zeolite layer; and the three-way catalyst is applied to the second zeolite layer.

14. The method of claim 13, further comprising forming the first zeolite layer on a substrate layer.

15. The method of claim 13, further comprising extruding the first zeolite layer.

16. The method of claim 11, wherein the copper and the least one of nickel and manganese are introduced by ion-exchange.

17. The method of claim 11, wherein the copper and the least one of nickel and manganese are introduced by wet impregnation.

18. The method of claim 11, wherein the copper is introduced into the zeolite at 20% to 50% of an ion-exchange level of the zeolite and the at least one of nickel and manganese is introduced into the zeolite at 85% to 100% total of an ion-exchange level of the zeolite.

19. A hydrocarbon trap catalyst, comprising:
    a zeolite including copper present at 10% to 75% of an ion-exchange level of the zeolite and at least one of nickel and manganese present at 50% to 100% total of an ion-exchange level of the zeolite; and
    a three-way catalyst layer covering the zeolite,
    the zeolite is a beta zeolite having a 3-D network of 12-ring pores and a silica-alumina ratio of 25 to 50.

20. The hydrocarbon trap catalyst of claim 19, wherein the zeolite is a beta zeolite having a silica-alumina ratio of 30 to 45 and the copper occupies 20% to 50% of a total number of ion-exchange sites of the zeolite.

* * * * *